US008225297B2

(12) United States Patent
Gray et al.

(10) Patent No.: US 8,225,297 B2
(45) Date of Patent: Jul. 17, 2012

(54) CACHE METADATA IDENTIFIERS FOR ISOLATION AND SHARING

(75) Inventors: Jan Gray, Bellevue, WA (US); Timothy L. Harris, Cambridge (GB); James Larus, Mercer Island, WA (US); Burton Smith, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 934 days.

(21) Appl. No.: 11/890,448

(22) Filed: Aug. 6, 2007

(65) Prior Publication Data

US 2008/0040551 A1 Feb. 14, 2008

Related U.S. Application Data

(63) Continuation-in-part of application No. 11/811,148, filed on Jun. 8, 2007, which is a continuation-in-part of application No. 11/389,451, filed on Mar. 23, 2006.

(60) Provisional application No. 60/748,386, filed on Dec. 7, 2005.

(51) Int. Cl.
*G06F 12/00* (2006.01)

(52) U.S. Cl. ............... 717/141; 711/145; 711/E12.026

(58) Field of Classification Search ................ None
See application file for complete search history.

(56) References Cited

U.S. PATENT DOCUMENTS

| | | | |
|---|---|---|---|
| 5,940,838 | A | 8/1999 | Schmuck et al. |
| 6,081,883 | A | 6/2000 | Popelka et al. |
| 6,327,175 | B1 | 12/2001 | Manapat et al. |
| 6,658,539 | B2 * | 12/2003 | Arimilli et al. ............... 711/141 |
| 6,754,773 | B2 | 6/2004 | Ulrich et al. |
| 6,775,727 | B2 | 8/2004 | Moyer |
| 6,880,045 | B2 | 4/2005 | Pong et al. |
| 7,114,036 | B2 | 9/2006 | DeWitt, Jr. et al. |
| 7,188,216 | B1 | 3/2007 | Rajkumar et al. |
| 2002/0087614 | A1 | 7/2002 | Kocev et al. |
| 2004/0015642 | A1 | 1/2004 | Moir |

(Continued)

FOREIGN PATENT DOCUMENTS

WO 2004/042583 A2 5/2004

OTHER PUBLICATIONS

International Search Report and Written Opinion Received for PCT Application No. PCT/US2008/065381, mailed on Jan. 16, 2009, 11 pages.

(Continued)

*Primary Examiner* — Yaima Campos
*Assistant Examiner* — Thanh D Vo
(74) *Attorney, Agent, or Firm* — Klarquist Sparkman, LLP

(57) ABSTRACT

Various technologies and techniques are disclosed for providing software accessible metadata on a cache of a central processing unit. A multiprocessor has at least one central processing unit. The central processing unit has a cache with cache lines that are augmented by cache metadata. The cache metadata includes software-controlled metadata identifiers that allow multiple logical processors to share the cache metadata. The metadata identifiers and cache metadata can then be used to accelerate various operations. For example, parallel computations can be accelerated using cache metadata and metadata identifiers. As another example, nested computations can be accelerated using metadata identifiers and cache metadata. As yet another example, transactional memory applications that include parallelism within transactions or that include nested transactions can be also accelerated using cache metadata and metadata identifiers.

19 Claims, 35 Drawing Sheets

U.S. PATENT DOCUMENTS

| | | |
|---|---|---|
| 2005/0086446 A1 | 4/2005 | McKenney et al. |
| 2005/0210198 A1 | 9/2005 | Dimpsey et al. |
| 2006/0085591 A1 | 4/2006 | Kumar et al. |
| 2006/0161740 A1 | 7/2006 | Kottapalli et al. |

OTHER PUBLICATIONS

Saha, Bratin, et al. "Architectural Support for Software Transactional Memory." The 39th Annual IEEE/ACM International Symposium on Microarchitecture (MICRO'06). 12 pages. 2006.

Marathe, Virendra J., et al. "Lowering the Overhead of Nonblocking Sortware Transactional Memory." 11 pages. May 17, 2006.

Adl-Tabatabai, Ali-Reza, et al. "Unlocking Concurrency." ACM Queue. 10 pages. Dec./Jan. 2006-2007.

Moore, Kevin, et al. "LogTM: Log-based Transactional Memory." 12th Annual International Symposium on High Performance Computer Architecture (HPCA-12). 12 pages. Feb. 2006.

Harris, Tim, et al. "Optimizing Memory Transactions." 12 pages. 2006.

International Search Report and Written Opinion for PCT Application No. PCT/US2008/065370, mailed on Oct. 31, 2008, 10 pages.

* cited by examiner

FIG 3 170

Exemplary Private Data Cache Enhanced with CLMD and VAMD Cache Metadata

| LINE # | LP# | ADDRESS | MESI | CACHE DATA | | | | | |
|---|---|---|---|---|---|---|---|---|---|
| 0 | | A | MESI[A] | A[0] | A[7] | A[8] | A[15] | ... | A[56] | A[63] |
| | LP0 | clmd | | | vamd | | vamd | | vamd | vamd |
| | LP1 | clmd | | | vamd | | vamd | | vamd | vamd |
| | LP2 | clmd | | | vamd | | vamd | | vamd | vamd |
| | LP3 | clmd | | | vamd | | vamd | | vamd | vamd |
| 1 | | B | MESI[B] | B[0] | B[7] | B[8] | B[15] | ... | B[56] | B[63] |
| | LP0 | clmd | | | vamd | | vamd | | vamd | vamd |
| | LP1 | clmd | | | vamd | | vamd | | vamd | vamd |
| | LP2 | clmd | | | vamd | | vamd | | vamd | vamd |
| | LP3 | clmd | | | vamd | | vamd | | vamd | vamd |
| ... | | | | ... | ... | ... | ... | ... | ... | ... |
| 1023 | | ZZ | MESI[ZZ] | ZZ[0] | ZZ[7] | ZZ[8] | ZZ[15] | ... | ZZ[56] | ZZ[63] |
| | LP0 | clmd | | | vamd | | vamd | | vamd | vamd |
| | LP1 | clmd | | | vamd | | vamd | | vamd | vamd |
| | LP2 | clmd | | | vamd | | vamd | | vamd | vamd |
| | LP3 | clmd | | | vamd | | vamd | | vamd | vamd |

Example Of New State Per Logical Processor Per Cache: Cache Metadata Control Registers (CMD)

```
struct CMD {                                  // cache metadata
    CLMD clmd_evictions;                      // or'd line evictions+invals summary
    CLMD clmd_specwritesmask;                 // subset of CLMD bits that indicate
                                              // speculative writes
    CLMD clmd_default;                        // default line load CLMD value
    VAMD vamd_default;                        // default line load VAMD value
                                              // (copied to every quadwords' VAMDs)
    void (*clmd_eviction_handler)();          //eviction handler vector
    CLMD clmd_eviction_handler_mask;          //eviction handler event mask
} struct CACHE += {
    CMD cmds[NLPS];
}
```

FIG. 4

CMD INSTRUCTIONS 330

| INSTRUCTION: SET_VAMD_DEFAULT | 332 |
| INSTRUCTION: GET_VAMD_DEFAULT | 334 |
| INSTRUCTION: SET_CLMD_DEFAULT | 336 |
| INSTRUCTION: GET_CLMD_DEFAULT | 338 |
| INSTRUCTION: SET_CLMD_SPEC_WRITES | 340 |
| INSTRUCTION: GET_CLMD_SPEC_WRITES | 342 |
| INSTRUCTION: SET_CLMD_EVICTIONS | 344 |
| INSTRUCTION: GET_CLMD_EVICTIONS | 346 |
| INSTRUCTION: CONDITIONAL_TEST_EVICTIONS | 348 |
| INSTRUCTION: CONDITIONAL_DISCARD | 349 |
| INSTRUCTION: GET_CACHE_LINE_SIZE | 350 |
| INSTRUCTION: GET_VAMD_BITS | 352 |
| INSTRUCTION: GET_VAMD_STRIDE | 354 |
| INSTRUCTION: GET_CLMD_BITS | 356 |

FIG. 9

FIG 26 Exemplary Data Cache Enhanced with CLMD, and VAMD Cache Metadata with Metadata Identifiers

776

| LINE # | LP# | ADDRESS | MESI | CACHE DATA | | | | | | |
|---|---|---|---|---|---|---|---|---|---|---|
| 0 | LP0 | A | MESI[A] | A[0] | ... | A[7] | A[8] | A[15] | ... | A[56] | A[63] |
| | LP1 | clmd | MDID | vamd | | | | | | |
| | LP2 | clmd | | | | | | | | |
| | LP3 | clmd | | | | | | | | |
| | | clmd | | | | | | | | |
| 1 | LP0 | B | MESI[B] | B[0] | ... | B[7] | B[8] | ... | B[15] | ... | B[56] | B[63] |
| | LP1 | clmd | MDID | vamd | | | | | | |
| | LP2 | clmd | | | | | | | | |
| | LP3 | clmd | | | | | | | | |
| | | clmd | | | | | | | | |
| ... | | ... | ... | ... | ... | ... | ... | ... | ... | ... |
| 1023 | LP0 | ZZ | MESI[ZZ] | ZZ[0] | ... | ZZ[7] | ZZ[8] | ... | ZZ[15] | ... | ZZ[56] | ZZ[63] |
| | LP1 | clmd | MDID | vamd | | | | | | |
| | LP2 | clmd | | | | | | | | |
| | LP3 | clmd | | | | | | | | |
| | | clmd | | | | | | | | |

EXEMPLARY MDID-SPECIFIC HARDWARE INSTRUCTIONS 800

INSTRUCTION: SET_MDID_CURR 804

INSTRUCTION: GET_MDID_CURR 806

INSTRUCTION: GET_MDID_BITS 808

INSTRUCTION: VAMD_GET 812

INSTRUCTION: VAMD_SET 814

INSTRUCTION: VAMD_GET2 816

INSTRUCTION: VAMD_SET2 818

FIG. 28

CACHE METADATA IDENTIFIERS FOR ISOLATION AND SHARING

CROSS-REFERENCE TO RELATED APPLICATIONS

This is a continuation-in-part application of application Ser. No. 11/811,148, filed Jun. 8, 2007, which is a continuation-in-part application of application Ser. No. 11/389,451, filed Mar. 23, 2006, which claims the benefit of U.S. Provisional Application No. 60/748,386, filed Dec. 7, 2005.

BACKGROUND

A CPU cache is a computer hardware mechanism used by the central processing unit of a computer to reduce the average time to access memory. A cache is a small, fast memory that retains copies of the data from recently used main memory locations. If a subsequent memory access is to a memory address that has been retained in the cache, the memory access is satisfied using the cache memory. Thus, the more accesses that are performed from cached memory locations, the lower the average memory access time, and the faster the application program runs.

Cache memory is subdivided into cache lines. Each cache line has a copy of some fixed-size, contiguous range of bytes of main memory. Each cache line also has an address tag and other state that identifies whether the cache line is presently valid and if so what addressed range of data are retained in the cache line. Cache lines are of a fixed size, typically 32 to 256 bytes, that depends upon the hardware design. When a CPU performs a read or write memory access to a data at a given address in main memory, it also checks whether that address is contained in its cache, in particular, if the cache contains a cache line which is valid and whose address tag matches the memory address of the access. If so, then a cache hit occurs, and the CPU accesses the data in the cache line. Otherwise, a cache miss occurs and the CPU proceeds down the slower path of accessing the data elsewhere, and recording a copy of the data in a cache line in the CPU cache. Since a cache is of fixed size, to retain new data in a cache line, it may be necessary to evict (invalidate) data that may have been previously held in that cache line.

Software application programs execute a sequence of hardware instructions to effect a computation. Such instructions may perform arithmetic operations, may alter the program control flow sequence of subsequent instructions, may read or write (collectively, access) data at specific memory addresses, or perform other operations. When a CPU cache is used with a CPU, its presence, and any information about which addresses are currently cached, and any hardware processes of checking, validating, and invalidating cache lines, is typically invisible and inaccessible to software programs, except that programs usually execute faster.

Modern computers may have a plurality of layers of caches. For example, a small, fast level one cache (L1$) may quickly service most memory accesses; but on an L1$ miss, a larger, slower level two cache (L2$) may be accessed. Only upon a memory access that misses both the L1$ and L2$ would the access be performed to the relatively very slow main memory.

Modern computers may also be multiprocessors, which have a plurality of CPUs. In a shared memory multiprocessor, each CPU may access the same shared memory, so one CPU may write to shared memory and later another CPU may read the data written by the first. Each CPU may have one or more layers of cache for its exclusive use (private cache) as well as one or more layers of caches shared with other CPUs (shared cache). In the presence of multiple CPUs with caches, multiprocessors implement cache coherence to transparently provide the multiple threads of execution in the software program with the illusion that all memory accesses are to a single common shared main memory. Here the simple notion that a given cache line is valid is replaced with more elaborate cache line validity states, state machines, and signaling protocols called cache coherence protocols. Sometimes an access in one CPU (such as a write) must invalidate a cache line in other CPUs.

It is also possible to factor and share hardware resources in a multiprocessor so as to share some, or nearly all, of the duplicated hardware resources between multiple CPUs. In an extreme case, a logical plurality of CPUs can be implemented in hardware in a time multiplexed fashion upon a single CPU core, by providing a plurality of copies of all the processor state and registers, called hardware thread contexts, in a single CPU. This is known as a multithreaded CPU core. For example, a single CPU core with four distinct thread contexts, e.g. four copies of its program counter, general purpose registers, and special purpose registers, nonetheless appears to application software and operating system software as four logical processors (LPs), indistinguishable in behavior, if not performance, from a multiprocessor comprising four separate CPU cores.

Over time, computer hardware has become faster and more powerful. Today's multiprocessors provide multiple CPU cores that can operate in parallel. Programmers would like different pieces of a program to execute in parallel on these multiple cores, to take advantage of the performance improvements that can be achieved. However, parallel programming is quite difficult for the average programmer using the software development techniques of today, and thus system implementers are developing new programming models that can be used to better write parallel programs. Some of these new programming models are following a transactional memory approach, which uses a transaction abstraction to help coordinate parallel threads' access to shared memory. Transactions do not automatically provide parallelism per se, but they do shift some of the burden of coordinating parallel tasks to other parts of the system, such as the compiler or runtime.

SUMMARY

Various technologies and techniques are disclosed for providing software accessible metadata in a cache of a central processing unit. The metadata state can include at least some bits of state for each quantum of addressed data, at least some state for each cache line, and at least some state for the cache overall. Additional instructions in the central processing unit are provided for interacting with this metadata. New side effects are introduced into operations of the central processing unit and cache by presence of the metadata and the additional instructions. The metadata can be accessed by at least one software program to facilitate an operation of the software program.

In one implementation, a bounded transactional memory application is provided that accesses cache metadata in a cache of a central processing unit. When performing a transactional read from the bounded transactional memory application, a cache line metadata transaction-read bit is set. When performing a transactional write from the bounded transactional memory application, a cache line metadata transaction-write bit is set and a conditional store is performed. At commit time, if any lines marked with the transaction-read bit or the transaction-write bit were evicted or invalidated, all speculatively written lines are discarded. The application can also interrogate a cache line metadata eviction summary to determine whether a transaction is doomed and then take an appropriate action.

In another implementation, a hardware accelerated software transactional memory (HASTM) application is provided. The software transactional memory application has access to metadata in a cache of a central processing unit that can be used to improve the operation of the STM system, in particular to accelerate some of the most time consuming operations in the software transactional memory operation. For example, open read barrier filtering is provided that uses an opened-for-read bit that is contained in the cache metadata to quickly filter (test and set) whether a given transactional memory datum has already received the expensive software bookkeeping it requires. If so, the redundant 'open for read' software bookkeeping is safely skipped. Read log validation is also accelerated using metadata. As a transaction runs, the HASTM software sets a read-set bit in the cache line metadata for each accessed datum, accumulating in the cache a 'read set' of metadata state representing the set of data the transaction read. This cache metadata is retained alongside its cached data unless evicted or unless invalidated when some other CPU writes to data in this CPU's read set. At transaction commit time, or earlier, the application may interrogate the cache line metadata eviction summary; if no lines were evicted, the CPU's read set is intact, so software read set validation is unnecessary and can be skipped. This same read-set cache line metadata also accelerates the retry facility of a software transactional memory system. If an application uses a transaction retry statement to roll back its transaction and then await a change in its read set, the HASTM software need only establish a software handler vector to await invalidation of a read-set bit of cache line metadata. Then when another CPU writes some data that is in the application's read set, the corresponding cache line (and hence its read-set bit in its cache line metadata) will be invalidated, triggering a jump to a software handler that concludes the 'retry' action and resumes (restarts) the transaction.

In yet another implementation, one or more central processing units have a cache with cache lines that are augmented by cache metadata, with the cache metadata including software-controlled metadata identifiers that allow multiple logical processors to share the cache metadata. The metadata identifiers and cache metadata can be used to accelerate various computations.

For example, in one implementation, parallel computations can be accelerated using cache metadata and metadata identifiers. A metadata identifier is obtained. Then, when parallelizing a computation, such as a transaction, the metadata identifier is assigned to parallel threads in the computation. Metadata accesses of the cache metadata are performed from the parallel threads using the metadata identifier.

In another implementation, nested computations can be accelerated using metadata identifiers and cache metadata. When entering a new nest level of a computation, such as a new nest level of a nested transaction, a new metadata identifier is obtained. Accesses to the cache metadata are performed using the new metadata identifier. Upon exiting the new nest level of the computation and resuming at a prior nest level, a different metadata identifier is obtained. Accesses to the cache metadata at the prior nest level are then performed using the different metadata identifier. One non-limiting example of a nested computation is a nested transaction.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a diagram illustrating exemplary hardware structure that implements additional metadata per logical processor per cache line for the system of FIG. 1.

FIG. 4 is a diagram illustrating exemplary hardware structure that implements additional metadata per logical processor per cache for the system of FIG. 1.

FIG. 9 is a diagrammatic view of exemplary CMD instructions for the central processing unit of FIG. 5.

FIG. 26 is a diagrammatic view of one implementation that illustrates exemplary data cache that has been enhanced with CLMD and VAMD cache metadata, and with metadata identifiers.

FIG. 28 is a diagrammatic view of exemplary hardware instructions for one implementation that are used with metadata identifiers.

DETAILED DESCRIPTION

Figure 1:
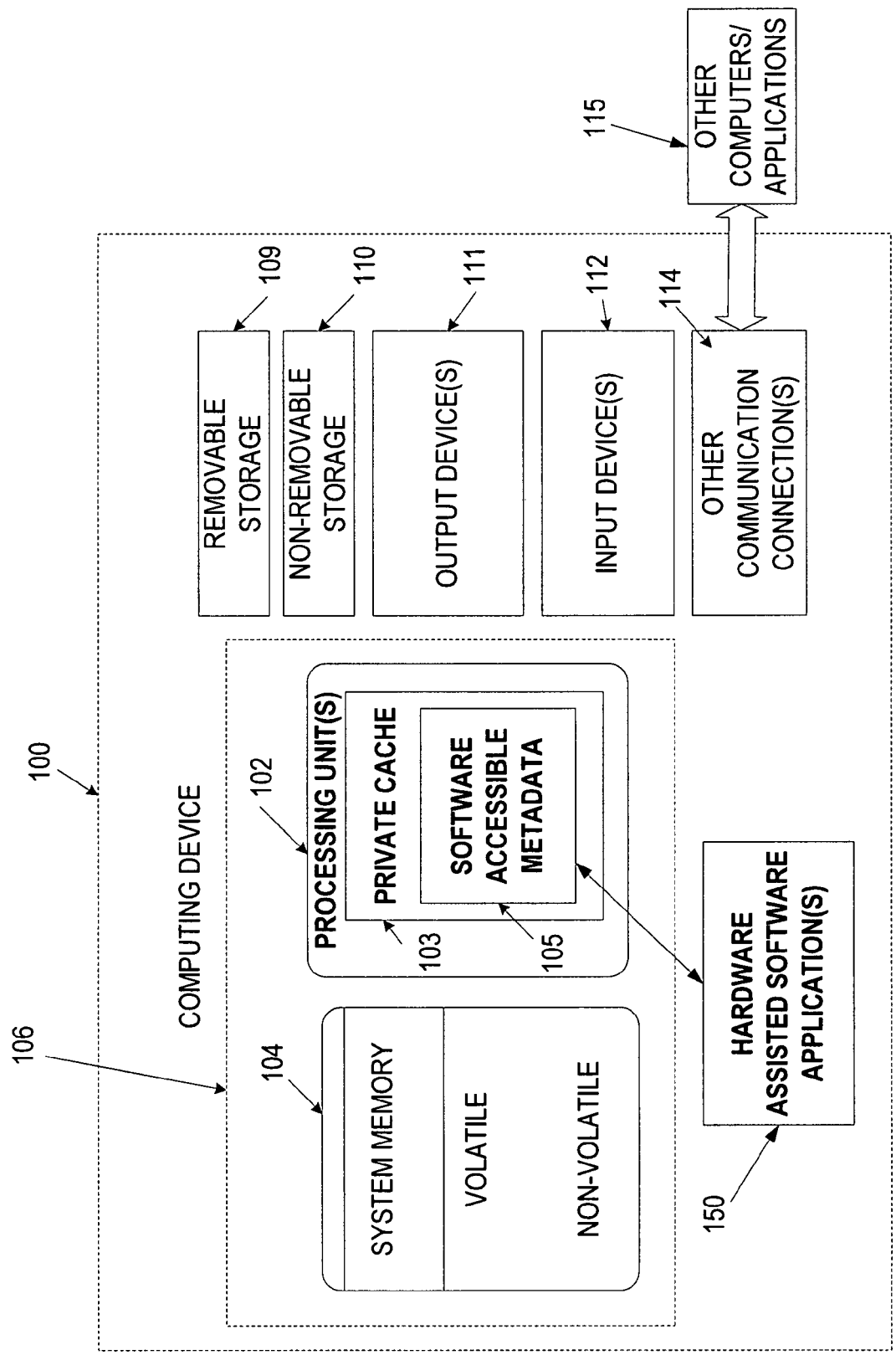
FIG. 1 is a diagrammatic view of a computer system of one implementation.

The technologies and techniques herein may be described in the general context as a system that has a central processing unit that uses cache metadata on the CPU cache for improving the operation of one or more software programs. As shown in FIG. 1, an exemplary computer system to use for implementing one or more parts of the system includes a computing device, such as computing device 100. In its most basic configuration, computing device 100 typically includes at least one processing unit 102 and memory 104.

In one implementation, central processing unit(s) 102 include a cache 103 with software accessible metadata 105. These metadata are described in further detail in several other figures herein. One or more hardware assisted software application(s) 150 can access the metadata 105 of the CPU cache 103 to facilitate an operation of the respective software application. A few non-limiting examples of hardware assisted software applications can include, but are not limited to transactional memory systems, garbage collection systems, systems for analyzing the performance or run-time behavior of programs, systems for finding defects in programs, systems for enforcing security constraints on programs, and/or any other types of software applications that can be improved (either in performance or in some other way) by using the metadata 105 on the CPU cache 103. These software applications may directly read and write the metadata as appropriate for the given scenario. Alternatively or additionally, the hardware itself may read and/or modify the metadata as appropriate.

Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 109 and non-removable storage 110. Computer storage media includes volatile and non-volatile, removable and non-removable media implemented in any method or technology for storage of information such as computer readable instructions, data structures, program modules or other data. Memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

Figure 2:
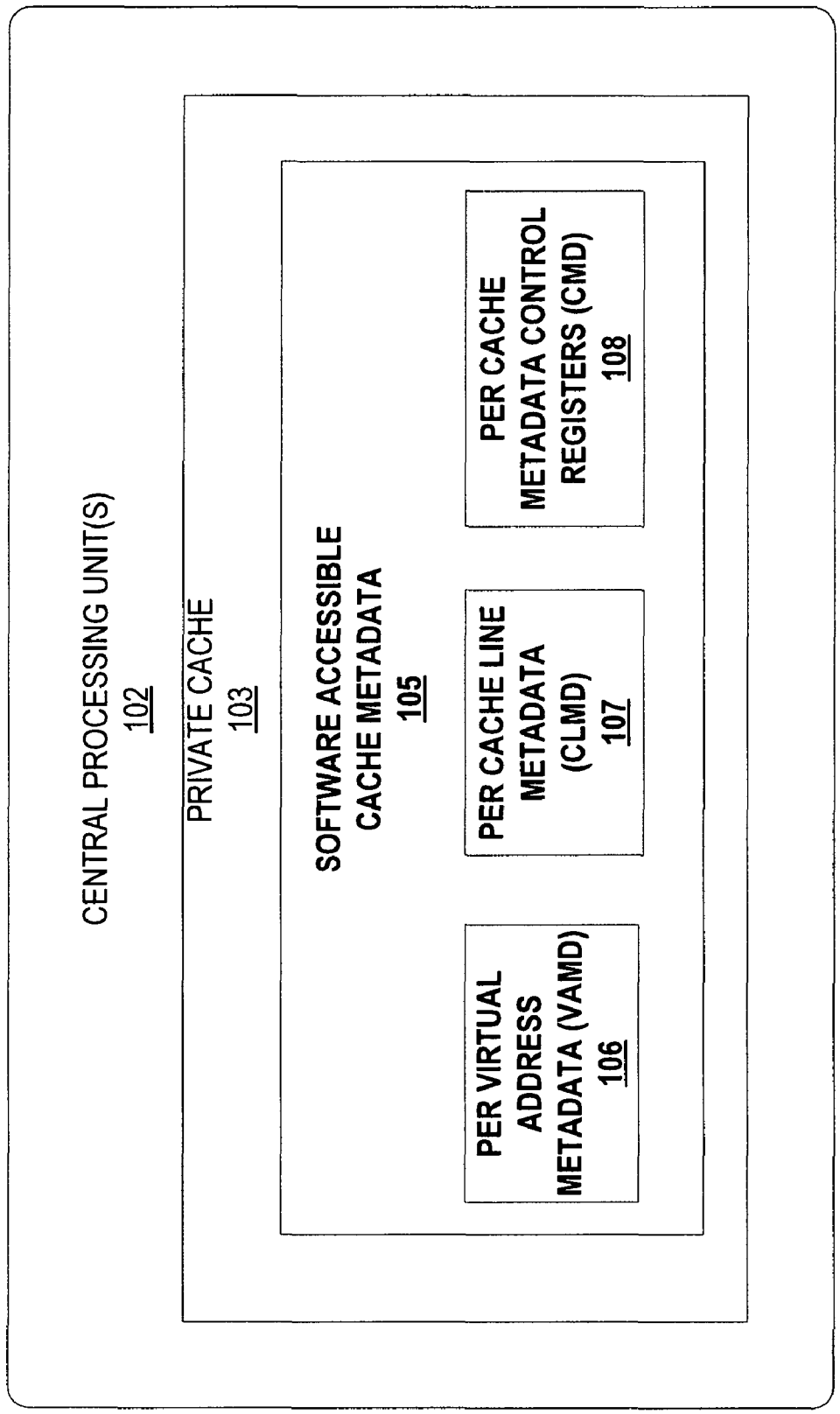
FIG. 2 is a more detailed diagrammatic view of a central processing unit of one implementation operating on the computer system of FIG. 1.

FIG. 2 is a more detailed diagrammatic view of a central processing unit 102 of one implementation operating on the computer system of FIG. 1. Cache 103 of CPU 102 includes software accessible cache metadata 105. This metadata (for short) is additional, software accessible state associated with cached data. With the exception of the cache metadata control registers described below, the cache metadata state is retained only for the time interval that its corresponding data is cached. In the example shown, the software accessible metadata 105 include per virtual address metadata (called VAMD herein) 106, per cache line metadata (called CLMD herein), and/or per cache metadata control registers (called CMD herein) 108. The VAMD 106, CLMD 107, and/or CMD 108 metadata in the CPU cache 103 can be accessed by one or more software applications to improve an operation of the respective application. It will be appreciated that in other implementations, some, additional, and/or other types of metadata could be used in the cache than those shown in FIG. 2, or in a hardware location other than the cache. For example, the VAMD state to be described could reside in a separate cache-like structure disjoint from CPU cache(s), and the CLMD state could reside in a separate centralized or distributed structure that interacts with the cache coherence system but is nevertheless disjoint from CPU cache(s). For the sake of illustration, however, these metadata 105 will be discussed in further detail in various figures herein to describe some techniques for improving software application operation.

FIG. 3 is a diagram illustrating exemplary hardware instructions 170 that implement additional metadata per logical processor per cache line for the system of FIG. 1. The term logical processor as used herein is meant to include each of the one or more actual CPU cores, and/or multithreaded CPU cores' hardware thread contexts that share a single cache. In the exemplary instructions 170 shown, each virtual address metadata (VAMD) of each quadword of the cache line of each logical processor is allocated four bits of metadata, and each cache line metadata (CLMD) of each cache line of each logical processor is allocated eight bits of metadata. These bit allocations are exemplary in nature, and other allocations could be used in other implementations. Furthermore, in the example shown in FIG. 3 and discussed herein, a VAMD is assigned to each 64-bit quadword of data in the cache line. One reason for using a quadword in the non-limiting example is because it is currently the smallest power-of-two block size for which there will never be two separate transacted objects in the same block. However, it will be appreciated that in other implementations, something smaller or larger than a quadword could be used for each VAMD and still take advantage of some or all of the various techniques discussed herein. It is important to note there is but one CLMD per cache line per logical processor that shares the cache; but there are potentially many VAMDs (one quadword) per cache line per logical processor.

Turning now to FIG. 4, a diagram is shown that illustrates exemplary hardware state 190 that implement cache metadata control registers per logical processor per cache. In the example shown, these registers 190 control and track various cache metadata behaviors, including CLMD evictions summaries, CLMD speculative writes, a CLMD default value, a VAMD default value, a transaction handler vector address and an CLMD eviction mask that triggers a transaction handler invocation. Some, all, and/or additional cache-level details can be tracked as part of the CMD. Some uses of these metadata are described in later examples.

Shown below is a C-language-esque hardware definition pseudocode of the baseline cache state and new cache metadata state hardware state for a four logical processor system that includes the new VAMD, CLMD, and CMD instructions shown in FIGS. 3 and 4. The new state is highlighted in bold. In one implementation, these instructions are private per core, but shared between logical processors.

```
// Simple exemplary 64 KB direct mapped L1 d-cache
const int NLPS = 4;          // no. of logical processors
const int NLINES = 1024;
const int LINESIZE = 64; // line size (bytes)
typedef void* VA;            // virtual address
typedef void* PA;            // physical address
typedef void* VALUE;         // arbitrary integer or FP data
typedef int LP;              // logical processor no.
typedef void (*HANDLER)( );  // function pointer e.g. address in instruction stream
const int VAMDBITS = 4;      // no. of virtual address metadata bits
typedef bit VAMD[VAMDBITS];// virtual address metadata "word"
const int VAMDSTRIDE = 8;    // no. of bytes covered per VAMD (e.g. quadword)
const int NVAMDS = LINESIZE/VAMDSTRIDE;
const int CLMDBITS = 8;              // no. of line metadata bits
typedef bit CLMD[CLMDBITS];          // line metadata "word"
const int CLMD__SPECWRITE = 0;       // bit position of special CLMD bit to
                                     // track and enforce speculative writes
struct LINE {
    PA tag;
    enum MESI { M, E, S, I } mesi;
    byte data[LINESIZE];
    VAMD vamds[NVAMDS][NLPS];// separate VAMD per quadword per LP
    CLMD clmds[NLPS];            // separate CLMD per logical processor
}
struct CMD {                         // cache metadata
    CLMD clmd__evictions;            // or'd line evictions+invals summary
    CLMD clmd__specwritesmask;       // subset of CLMD bits that indicate
                                     // speculative writes
    CLMD clmd__default;              // default line load CLMD value
    VAMD vamd__default;              // default line load VAMD value
                                     // (copied to every quadwords' VAMDs)
    HANDLER clmd__eviction_handler;      // eviction handler address
    CLMD clmd__eviction_handler__mask; // eviction handler event mask
}
struct CACHE {
    LINE lines[NLINES];
    ...
    CMD cmds[NLPS];
}
struct CORE {
    ...
    CACHE dcache;
```

```
    LP lp;                          // current logical processor no.
}
CORE core;
```

It should be emphasized that the abstract hardware definition pseudocode used throughout this detailed description is not an executable software program per se. Rather, it denotes in a relatively compact notation the novel cache metadata state and behaviors that a skilled computer designer must then recode into a circuit description or a concrete hardware definition language such as Verilog or VHDL.

In the non-limiting example shown above, for a 4-logical processor example sharing a 64 KB L1 cache, with 1024 64 byte lines, the additional cache metadata storage overhead is: 4 threads*8 bits*2K (lines)+4 threads*4 bits*8K (quadwords)=64 Kbit+128 Kbit=24 KB, or about 37% of the size of the entire cache. As noted previously, numerous other allocations and/or arrangements of CPU cache metadata could be used than shown in this hypothetical example.

Figure 5:
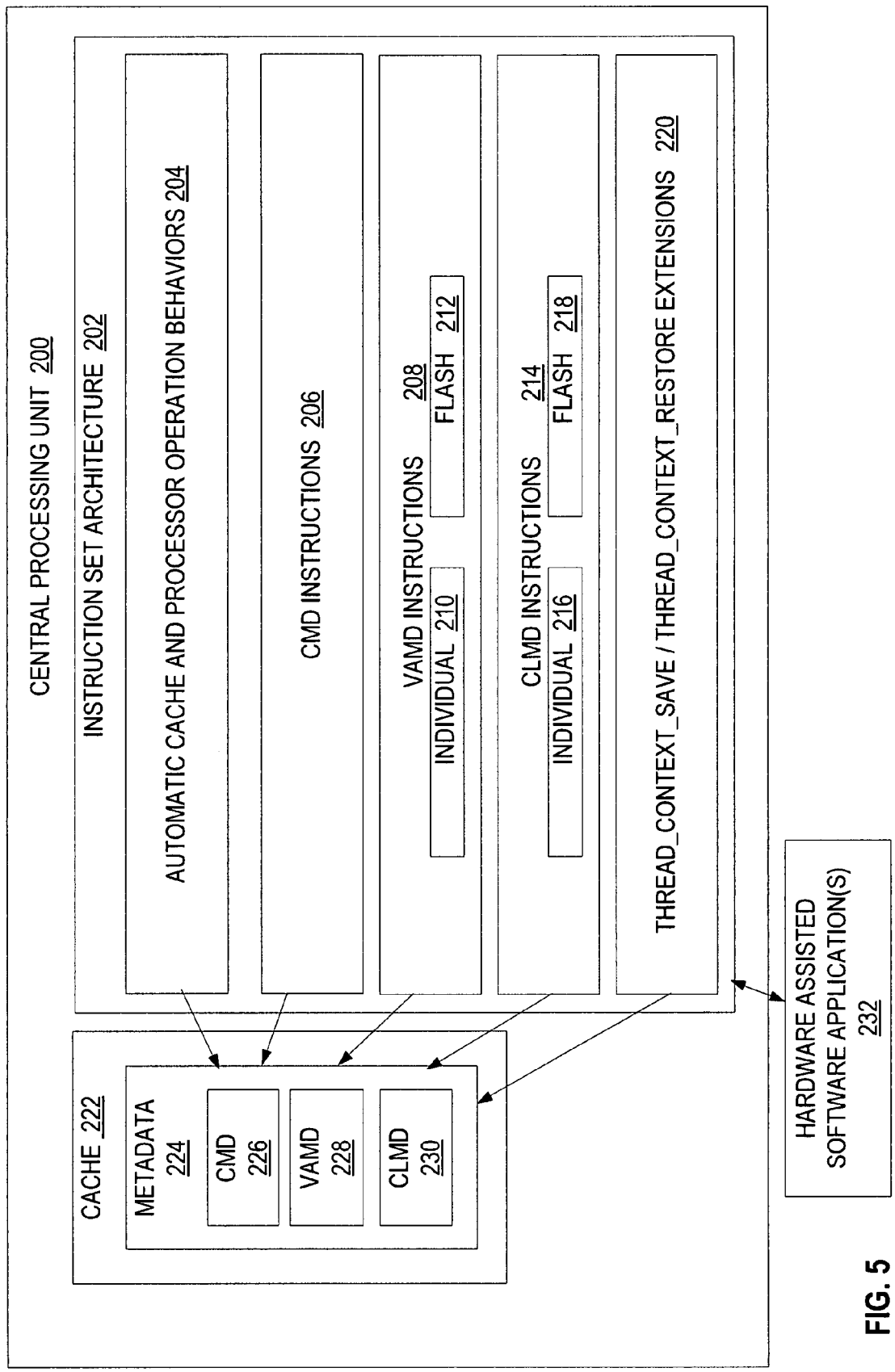
FIG. 5 is diagrammatic view of a central processing unit of the system of FIG. 1 illustrating an exemplary instruction set architecture and its interaction with cache metadata.

Turning now to FIG. 5, a diagrammatic view of a central processing unit 200 is shown that illustrates an exemplary 'cache metadata enhanced hardware instruction set architecture 202 provided by central processing unit 200, and its interaction with cache metadata 224 of the CPU cache 222. In one implementation, instruction set architecture 202 includes automatic cache and processor operation behaviors 204, CMD instructions 206, VAMD instructions 208, CLMD instructions 214, and thread context switch save/restore extensions 220. The automatic cache and processor operation behaviors 204 can interact with various metadata 224, as described in further detail in FIGS. 6-8. The CMD instructions 206 can interact with various metadata 226, as described in further detail in FIG. 9. VAMD instructions 208 include both individual instructions 210 and flash instructions 212. The VAMD instructions 208 can interact with the VAMD metadata 228 and/or other metadata as described in further detail in FIG. 10. CLMD instructions 214 can interact with the CLMD metadata 230 and/or other metadata as described in further detail in FIG. 11. CLMD instructions 214 include both individual instructions 216 and flash instructions 218. The thread context switch save/restore extensions 220 can interact with various metadata 224, as described in further detail in FIG. 12.

Figure 6:
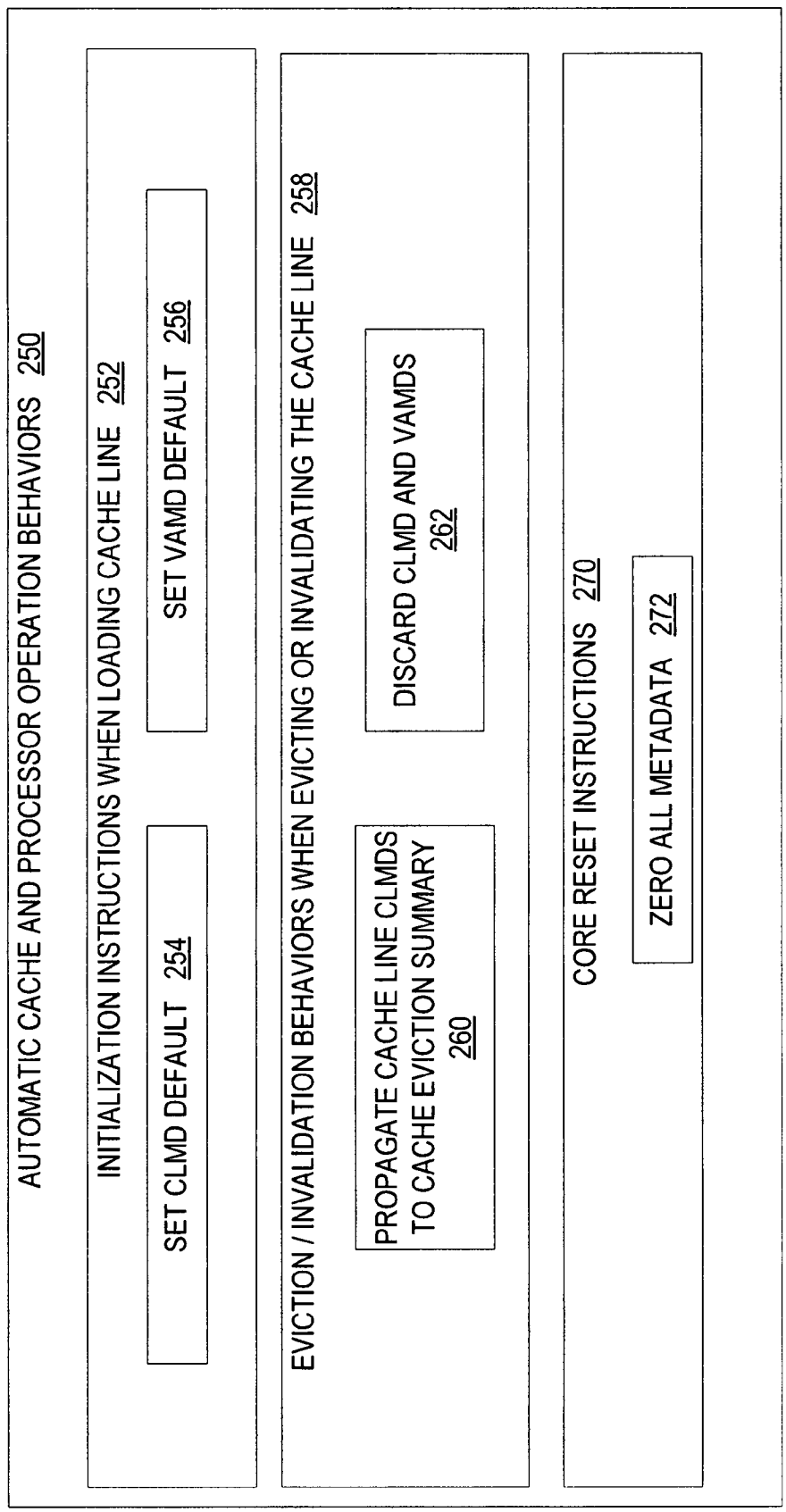
FIG. 6 is a diagrammatic view of exemplary automatic cache and processor operation instructions for the central processing unit of FIG. 5.

FIG. 6 is a diagrammatic view of exemplary automatic cache and processor operation behaviors 250 for the central processing unit 200 of FIG. 5. These behaviors extend prior art CPU and cache operations so as to account for the new cache metadata state. This impacts initialization (validation) 252, eviction/invalidation 258, and core reset operations 270. Cache line initialization occurs implicitly upon a cache line 252 during the hardware processing of a cache miss. Cache line initialization sets the line's CLMDs to the default value 254, and its VAMDs to the default value 256. Below is an example hardware definition pseudocode that illustrates additional initialization behaviors 252 for setting the default CLMDs 254 and the default VAMDs 256 for each logical processor. These stages are described in more detail in FIG. 7.

```
// load and validate the designated cache line
void load_line(LINE& line) += { // here += denotes extension of baseline
load_line behavior
    // initialize each logical processor's clmd
    for (int lp = 0; lp < NLPS; lp++)
        line.clmds[lp] = dcache.cmds[lp].clmd_default;
    // initialize each logical processor's line's vamds.
    for (int lp = 0; lp < NLPS; lp++)
        for (int i = 0; i < NVAMDS; i++)
            line.vamds[i][lp] =
                dcache.cmds[lp].vamd_default;
}
```

The eviction/invalidation operations 258 are designed to run when evicting or invalidating the cache line. Eviction occurs when a memory access from some logical processor on this cache forces some valid cache line to be repurposed to retain the newly accessed data. In that case, the data contents of the cache line are discarded or written back to memory, and the metadata contents are completely discarded. Invalidation occurs when a coherent memory access from another core forces a line to transition from a valid state to invalid in this particular level of the cache in this core. There are instructions for propagating the cache line CLMDs to the cache eviction summary 260 when the CPU determines that it is time to evict or invalidate a cache line. There are also instructions for discarding the CLMD and VAMD bits 262. An example hardware definition pseudocode is shown below for implementing these eviction/invalidation behaviors 258. These are described in further detail in FIG. 8.

```
// extend the baseline eviction behavior to also discard the line's cache metadata
void evict_line(LINE& line) += {
    discard_line(line);
}
// extend the baseline invalidation behavior to also discard the line's cache metadata
void invalidate_line(LINE& line) += {
    discard_line(line);
}
// the cache line is being repurposed; discard the line's cache metadata
void discard_line(LINE& line) {
    for (int lp = 0; lp < NLPS; lp++) {
        // Accumulate an eviction summary:
        // Propagate the line's CLMD metadata to its eviction summary via
        // a bitwise-or logical operation.
        dcache.cmds[lp].clmd_evictions |= line.clmds[lp];
        // Invalidate line (don't write back the line) if it is modified but was
        // speculatively written by *any* logical processor on this core.
```

```
        //
        if (line.mesi == MESI.M /* modified */ &&
            (line.clmds[lp] & dcache.cmds[lp].clmd_specwritesmask) != 0)
                line.mesi = MESI.I;
    }
}
```

Core reset instructions 270 can also be included to zero out all of the metadata 272. An example hardware instruction that zeros out all of the metadata is shown below. In the example shown, all cache metadata mode state bits are zeroed and all metadata is zeroed. For example, the CLMD evictions, CLMD speculative writes, the default CLMD value, and the default VAMD value are all set to zero.

```
// extend the baseline CPU core reset behavior to also reset the cache
metadata void core_reset( ) += {
    vamd_and_all((VAMD)0); // hardware definition pseudocode
    follows below clmd_and_all((CLMD)0);
    for (LP lp = 0; lp < NLPS; lp++) {
        CMD& cmd = dcache.cmds[lp];
        cmd.clmd_evictions = 0;
        cmd.clmd_specwrites = 0;
        cmd.clmd_default = 0;
        cmd.vamd_default = 0;
        cmd.clmd_eviction_handler = 0;
        cmd.clmd_eviction_handler_mask = 0;
    }
}
```

Figure 7:
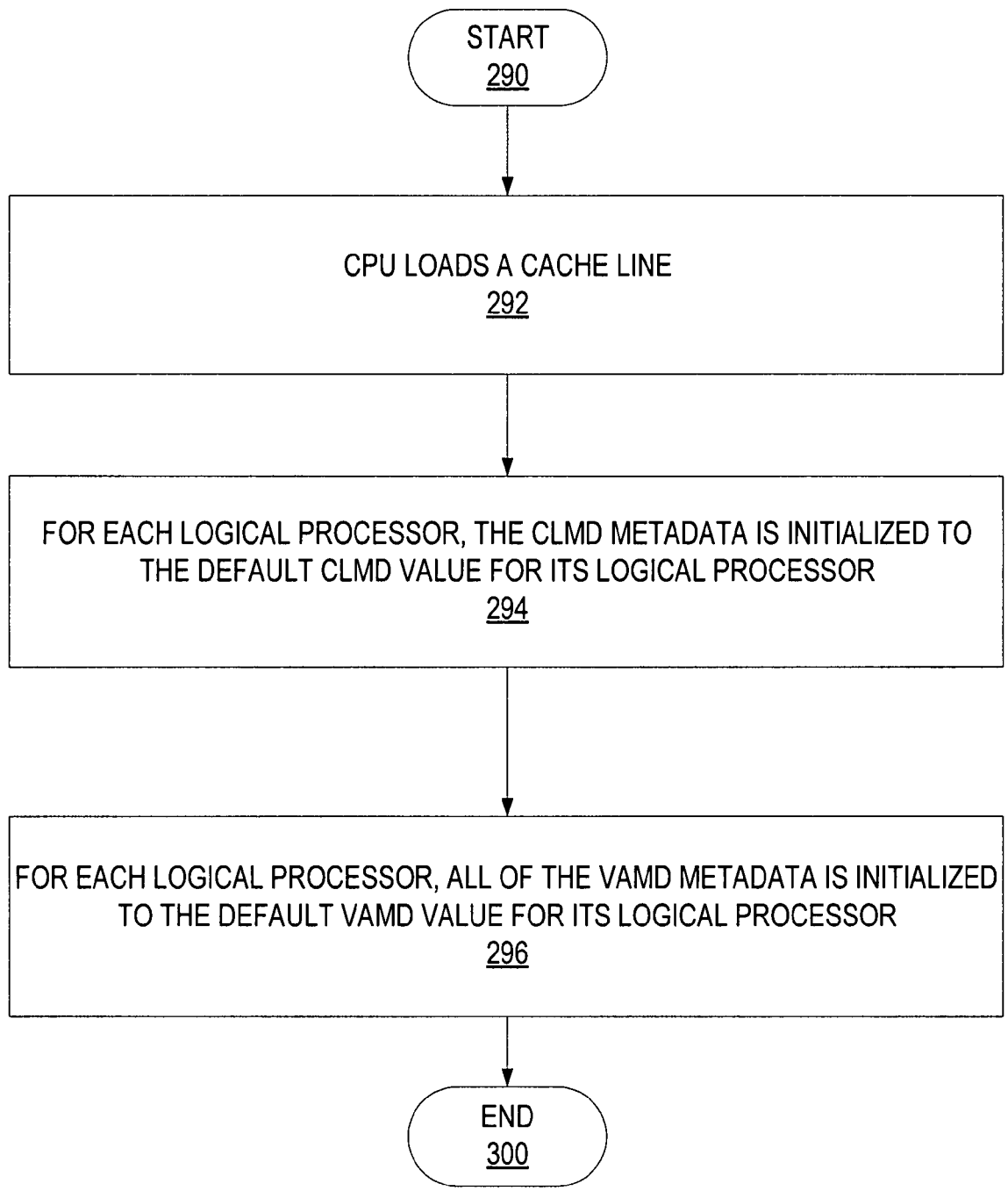
FIG. 7 is a process flow diagram for one implementation of the system of FIG. 1 that illustrates the stages involved in loading a cache line and initializing some cache metadata to default values.

Turning now to FIG. 7, one implementation of the stages involved in loading a cache line and initializing some cache metadata to default values is illustrated in further detail (than as initially described as part of the initialization instructions 252 of FIG. 6). In one form, the process of FIG. 7 is implemented in the hardware of computing device 100. The process begins at start point 290 with the CPU loading a cache line (stage 292). For each logical processor, the CLMD metadata is initialized to its logical-processor-specific default value (stage 294). For each logical processor, the VAMD metadata is similarly initialized to its LP-specific default value (stage 296). The process ends at end point 300.

Figure 8:
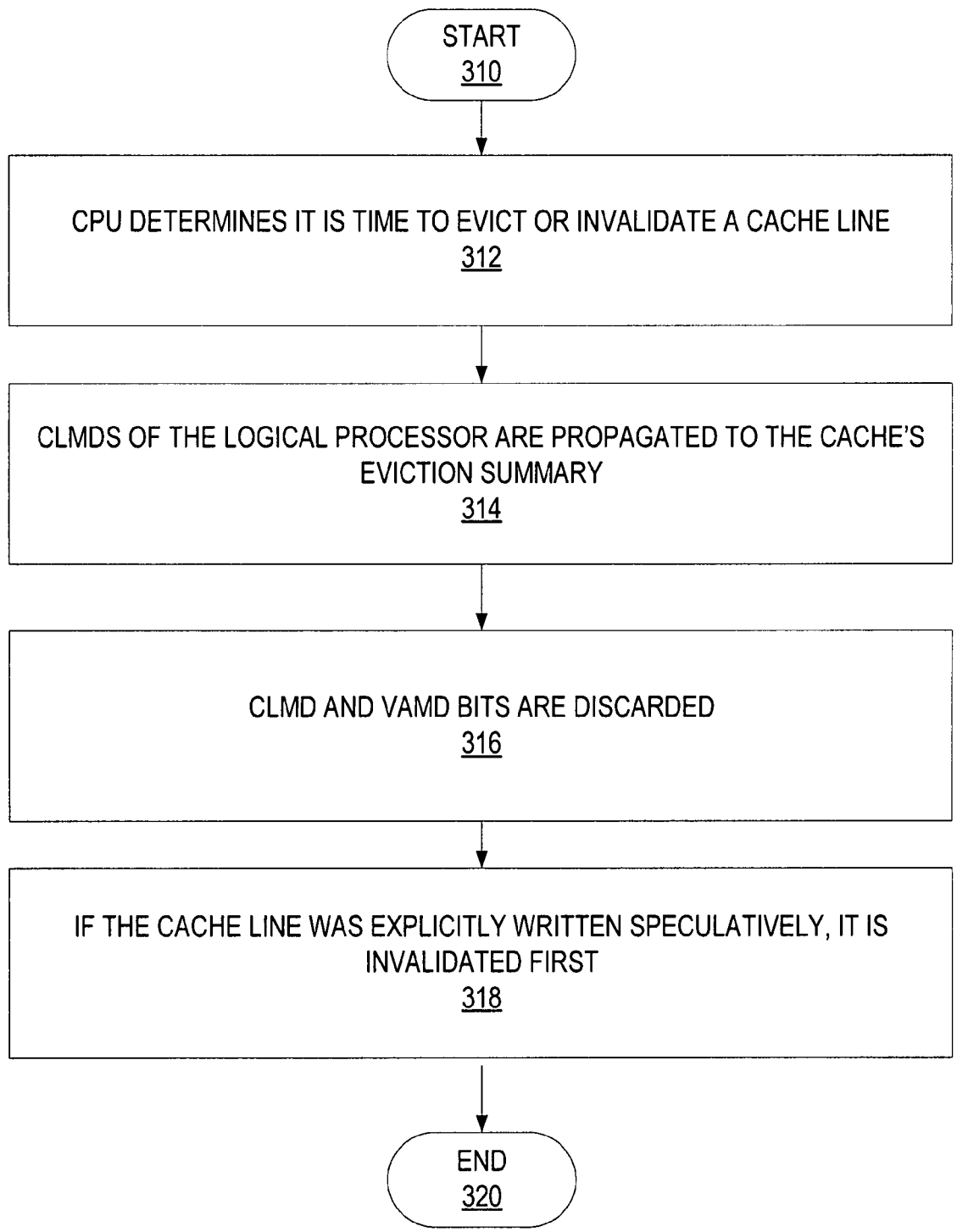
FIG. 8 is a process flow diagram for one implementation of the system of FIG. 1 that illustrates the stages involved in evicting or invalidating a cache line.

In FIG. 8, one implementation of the stages involved in evicting or invalidating a cache line is shown in further detail (than as initially described as part of the eviction/invalidation instructions 258 of FIG. 6). In one form, the process of FIG. 8 is implemented in the hardware of computing device 100. The process begins at start point 310 with the CPU determining it is time to evict or invalidate a cache line (stage 312). The CLMD's of the logical processor are propagated to the cache's eviction summary (stage 314). The line's CLMD and VAMD bits are then discarded (stage 316). If the cache line was explicitly written speculatively, it is invalidated first (not written back to main memory) (stage 318). The process ends at end point 320.

FIG. 9 is a diagrammatic view of exemplary CMD instructions for the central processing unit 200 of FIG. 5. As with all the new instructions introduced herein, these instructions extend and complement a base set of hardware instructions provided by a conventional CPU. In other words, they extend the base instruction set architecture. These hardware instructions are used by software to interact with various cache metadata state, and control cache metadata behaviors. For example, there are instructions for setting and getting the VAMD default value control register (332 and 334), and for setting and getting the CLMD default value control register (336 and 338). An example of hardware instruction definition pseudocode that could be used to provide such functionality for setting and getting these default values is shown below. (Here, the hardware definition pseudocode attribute "instruction" on a function designates the hardware operation is (or can be) made available as a novel CPU instruction for explicit use by software. In such cases, the function name suggests the CPU instruction name and its function arguments and return value suggest in- and out-parameters of the corresponding instruction, most commonly expressed as programmer specified registers or as implicit condition codes.)

```
// SET_VAMD_DEFAULT:
// Set the current default VAMD control register for this logical processor.
instruction void cache_set_vamd_default(VAMD vamd) {
    dcache.cmds[lp].vamd_default = vamd;
}
// GET_VAMD_DEFAULT:
// Get the current default VAMD control register for this logical processor.
instruction VAMD cache_get_vamd_default( ) {
    return dcache.cmds[lp].vamd_default;
}
// SET_CLMD_DEFAULT:
// Set the current default CLMD control register for this logical processor.
instruction void cache_set_clmd_default(CLMD clmd) {
    dcache.cmds[lp].clmd_default = clmd;
}
// GET_CLMD_DEFAULT:
// Set the current default CLMD control register for this logical processor.
instruction CLMD cache_get_clmd_default( ) {
    return dcache.cmds[lp].clmd_default;
}
```

In one implementation, CMD instructions 330 also include instructions for setting and getting the CLMD speculative writes control register (342 and 344), which sets and gets the control register that determines which CLMD bits that indicate the line has been speculatively written. An example of hardware instruction definition pseudocode that can be used to set and get the speculative writes is shown below.

```
// SET_CLMD_SPECWRITES:
// Set the current speculative writes CLMD mask control register for
this logical processor.
instruction void cache_set_clmd_specwrites(CLMD mask) {
    dcache.cmds[lp].clmd_specwrites = mask;
}
// GET_CLMD_SPECWRITES:
// Get the current speculative writes CLMD mask control register for
this logical processor.
instruction CLMD cache_get_clmd_specwrites(CLMD mask) {
    return dcache.cmds[lp].clmd_specwrites;
}
```

In one implementation, CMD instructions 330 includes instructions for setting and getting the CLMD evictions summary control register (344 and 346). An example of hardware instruction definition pseudocode that can be used to set and get the CLMD evictions is shown below.

```
// SET_CLMD_EVICTIONS:
// Set the current CLMD evictions summary control register for this
logical processor. instruction void
cache_set_clmd_evictions(CLMD clmd) {
        dcache.cmds[lp].clmd_evictions = clmd;
}
// GET_CLMD_EVICTIONS:
// Get the current CLMD evictions summary control register for this
logical processor. instruction CLMD cache_get_clmd_evictions( ) {
        return dcache.cmds[lp].clmd_evictions;
}
```

In one implementation, CMD instructions 330 includes instructions for setting and getting the CLMD eviction handler address and handler mask control registers (190). An example of hardware instruction definition pseudocode that can be used to set and get the CLMD evictions is shown below.

```
// SET_CLMD_EVICTION_HANDLER:
// Set the current CLMD eviction handler register for this logical
processor. instruction void
cache_set_clmd_eviction_handler(HANDLER handler) {
        dcache.cmds[lp].clmd_eviction_handler = handler;
}
// GET_CLMD_EVICTION_HANDLER:
// Get the current CLMD evictions summary control register for this
logical processor. instruction HANDLER cache_get_clmd_evictions( ) {
        return dcache.cmds[lp].clmd_eviction_handler;
}
// SET_CLMD_EVICTION_HANDLER_MASK:
// Set the current CLMD eviction handler mask control register for this
logical processor. instruction void
cache_set_clmd_eviction_handler(CLMD clmd) {
        dcache.cmds[lp].clmd_eviction_handler_mask = clmd;
}
// GET_CLMD_EVICTION_HANDLER_MASK:
// Get the current CLMD evictions handler mask control register for this
logical processor.
instruction CLMD cache_get_clmd_eviction_handler_mask( ) {
        return dcache.cmds[lp].clmd_eviction_handler_mask;
}
```

In one implementation, CMD instructions 330 can include hardware instructions for conditionally testing evictions with flash clearing and setting CLMD values on all cache lines 348. This can be used in a bounded transactional memory system, or for other purposes, as described in further detail herein. An example of hardware instruction definition pseudocode that can be used to conditionally test evictions with flash clear/set is shown below.

```
// COND_TEST_EVICTIONS_AND_OR_ALL:
// Atomically test whether any specific CLMD bits' evictions or
invalidations
// have occurred;
// and if not, flash clear (via AND) and flash set (via OR) specific
CLMD bit positions.
instruction bool cache_cond_test_evictions_and_or_all(
        CLMD clmd,      // mask, specifies noteworthy CLMD
                        eviction bits
        CLMD and_mask,  // mask, specifies CLMD bit positions to
                        retain
(AND)
        CLMD or_mask)   // mask, specifies CLMD bit positions to
                        set (OR)
{
        // 'atomic' means the inner block happens instantaneously, without
        // intervening interference from nor impact upon other CPUs
        or agents
        // in the system
        atomic {
                // Determine if there were any evictions of interest
                CLMD evictions = cache_get_clmd_evictions( );
                if ((evictions & clmd) == 0) {
                        // If not AND and then OR the bit masks over
                        all CLMD
                        // metadata in the cache.
                        clmd_and_all(and_mask);
                        clmd_or_all(or_mask);
                        return true;
                }
                else {
                        return false;
                }
        }
}
```

In one implementation, CMD instructions 330 can include hardware instructions for conditionally discarding cache lines 349 based on the CLMD. An example of hardware instruction definition pseudocode that can be used to conditionally discard cache lines is shown below.

```
// COND_DISCARD
// Conditionally flash clear all cache lines of this logical processor
with CLMDs
// with specific CLMD bit positions set.
instruction void cache_cond_discard(CLMD clmd) {
        for (int i = 0; i < NLINES; i++) {
                if ((dcache.lines[i].clmds[lp] & clmd) != 0) {
                        discard_line(dcache.lines[i]);
                }
        }
}
```

CMD instructions can also include instructions for getting the implemented size of certain data, such as getting cache line size 350, getting VAMD bits 352, getting VAMD stride 354, or getting CLMD size 356. An example hardware instruction definition pseudocode that can be used to get these basic metadata value sizes is shown below.

```
// GET_CACHE_LINE_SIZE
instruction unsigned get_cache_line_size( ) {
        return LINESIZE;
}
// GET_VAMD_BITS:
// Return implemented no. of VAMD_BITS (no. of bits in a VAMD).
instruction unsigned get_vamd_bits( ) {
        return VAMD_BITS;
}
// GET_VAMD_STRIDE:
// Return implemented VAMD_STRIDE bytes (no. of data bytes
per VAMD).
instruction unsigned get_vamd_stride( ) {
        return VAMD_STRIDE;
}
// GET_CLMD_BITS:
// Return implemented no. of CLMD_BITS (no. of bits in a CLMD).
instruction unsigned get_clmd_bits( ) {
        return CLMD_BITS;
}
```

An alternative implementation might provide such implementation specific parameter data via an alternative mechanism such as a general-purpose CPUID instruction.

Figure 10:
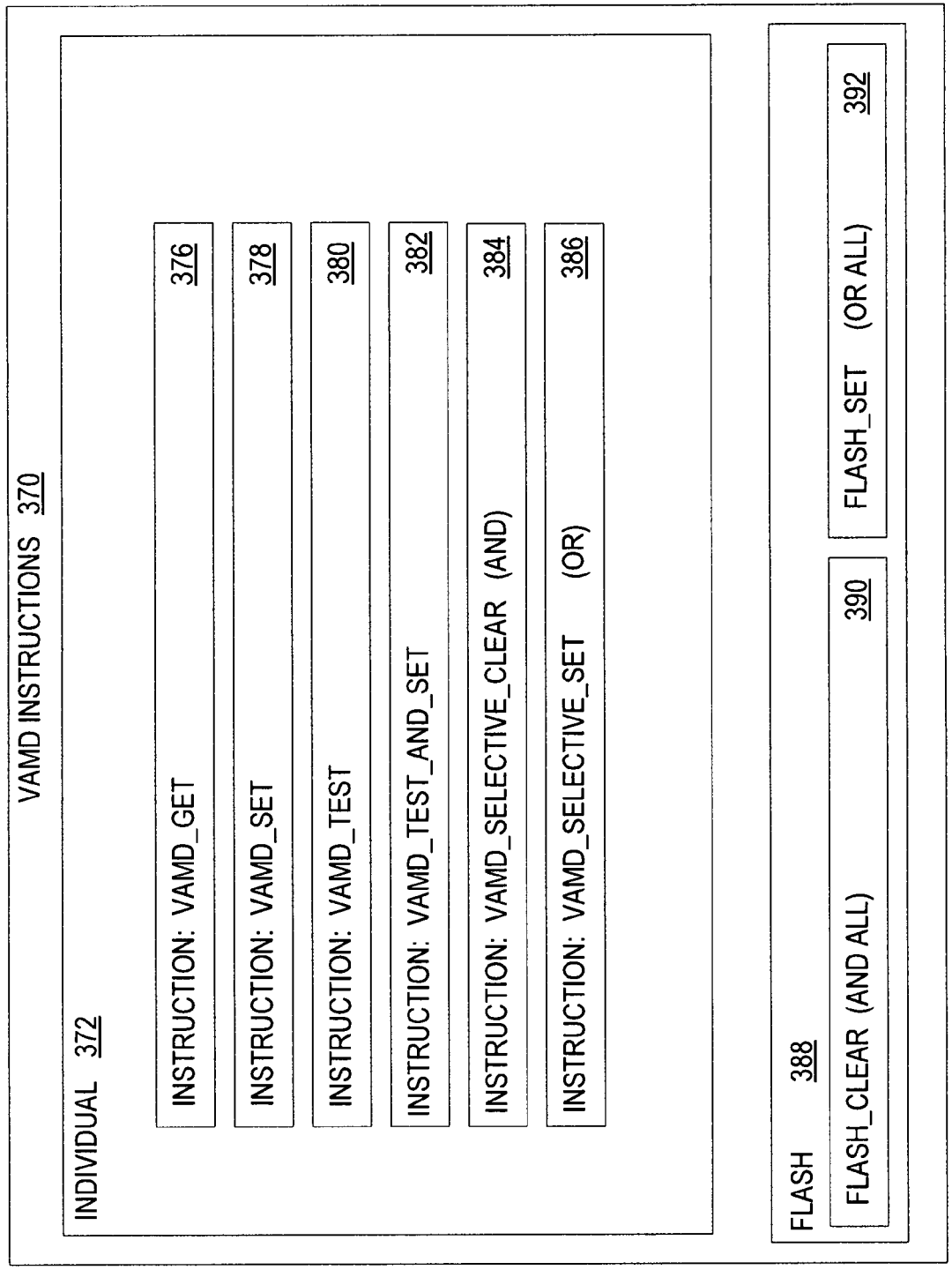
FIG. 10 is a diagrammatic view of exemplary VAMD instructions for the central processing unit of FIG. 5.

Turning now to FIG. 10, a diagrammatic view of exemplary VAMD instructions for the central processing unit 200 of FIG. 5 is shown. VAMD instructions 370 include individual instructions 372 that access specific VAMDs one at a time, and the flash instructions 388 that apply to all VAMDs in the cache. The individual instructions 372 can include instructions for implementing a VAMD get 376, a VAMD set 378, a VAMD test and set 382, a VAMD selective clear (and) 384, and a VAMD selective set (OR) 386.

We introduce a private VAMD helper pseudocode function that (like a read data instruction) takes an address 'va' and ensures its data is cached; then returns a reference (which in hardware, might be a control signal bit pattern) to the specific VAMD corresponding to the quadword of bytes at address va.

```
private VAMD& vamd_va(VA va) {
    validate_line(va);
    return dcache.lines[line_va(va)].vamds[offset_va(va)][lp];
}
```

The VAMD get instruction 376 selects and returns the current value of the particular VAMD that is appropriate for the particular address. The VAMD set instruction 378 stores a VAMD for the particular address. Example hardware definition pseudocode instructions for the get and set instructions are shown below.

```
// VAMD_GET
// Return the current VAMD for the datum at address 'va'.
// If the datum wasn't already in cache, it is now!
instruction VAMD vamd_get(VA va) {
    return vamd_va(va);
}
// VAMD_SET
// Set the current VAMD for the datum at the specified address 'va'.
// If the datum wasn't already in cache, it is now!
instruction void vamd_set(VAMD vamd, VA va) {
    vamd_va(va) = vamd;
}
```

The VAMD test instruction 380 fetches the VAMD for the particular address, performs an AND operation with the VAMD and the mask, and compares the result. In most CPU's base instruction set architectures, such comparison results are typically written to condition code registers or to general purpose registers. The VAMD test and set instruction 382 atomically tests and sets the address and then returns what was read before the set occurred. Example hardware instruction definition pseudocode for these two tests are shown below.

```
// VAMD_TEST
// Return true if all of the specified VAMD bits for the VAMD at
'va' are set.
instruction bool vamd_test(VAMD vamd, VA va) {
    return (vamd_va(va) & vamd) == vamd;
}
// VAMD_TEST_AND_SET
// Return true if all of the specified VAMD bits for the VAMD at
'va' are set;
// then set the specified bits.
instruction bool vamd_test_and_set(VAMD vamd, VA va) {
    atomic {
        bool ret = vamd_test(vamd, va);
        vamd_or(vamd, va);
        return ret;
    }
}
```

The VAMD selective clear instruction 384 selectively clears the VAMD and the VAMD selective set instruction 386 selectively sets the VAMD, as further illustrated in the hardware instructions below.

```
// VAMD_AND
// Bitwise-AND the VAMD mask against the VAMD for the specified
address 'va'.
// This may be used to clear certain VAMD bits.
instruction VAMD vamd_and(VAMD vamd, VA va) {
    return vamd_va(va) &= vamd;
}
// VAMD_OR
// Bitwise-OR the VAMD mask against the VAMD for the specified
address 'va'.
instruction VAMD vamd_or(VAMD vamd, VA va) {
    return vamd_va(va) |= vamd;
}
```

Alternatively or in addition to the individual instructions 372 for each VAMD cache line, whole cache flash VAMD instructions 388 can be provided. For example, a flash clear ('AND ALL') instruction 390 can be provided, along with a flash set ('OR_ALL') instruction 392. In the example hardware instruction definition pseudocode shown below, the VAMD_AND_ALL instruction is designed to flash clear designated VAMD bits of all of the VAMDs for each cache line of this logical processor, and the VAMD_OR_ALL instruction is designed to similarly flash set all of the VAMDs for each cache line of this logical processor.

```
// VAMD_AND_ALL
// Flash bitwise-AND the specified mask over all the current logical
// processor's VAMDs.
instruction void vamd_and_all(VAMD vamd) {
    for (int i = 0; i < NLINES; i++)
        for (int j = 0; j < NVAMDS; j++)
            dcache.lines[i].vamds[j][lp] &= vamd;
}
// VAMD_OR_ALL
// Flash bitwise-OR the specified mask over all the current logical
// processor's VAMDs.
instruction void vamd_or_all(VAMD vamd) {
    for (int i = 0; i < NLINES; i++)
        for (int j = 0; j < NVAMDS; j++)
            dcache.lines[i].vamds[j][lp] |= vamd;
}
```

Figure 11:
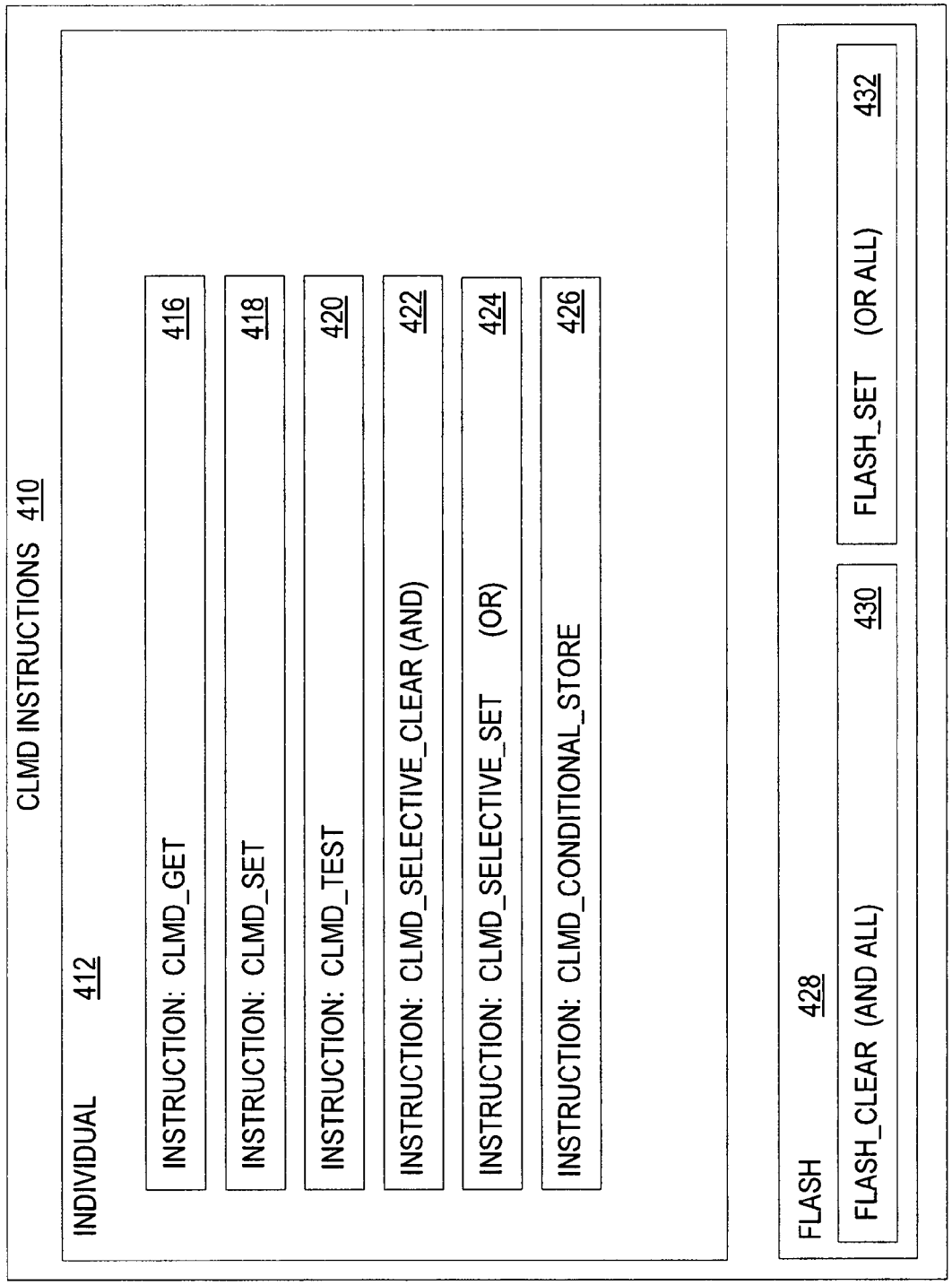
FIG. 11 is a diagrammatic view of exemplary CLMD instructions for the central processing unit of FIG. 5.

Turning now to FIG. 11, a diagrammatic view of exemplary CLMD instructions 410 for the central processing unit 200 of FIG. 5 is shown. In one implementation, there are individual instructions 412 for accessing a specific CLMD, one at a time, and flash instructions 428 that apply to all CLMDs. The individual instructions can include instructions for CLMD get 416, CLMD set 418, CLMD test 420, CLMD selective clear (AND) 422, CLMD selective set (OR) 424, and CLMD conditional store 426. These individual instructions operate similarly as just described with respect to the VAMD instructions, but are discussed herein briefly for the CLMD context. For example, the get and set instructions (416 and 418) get and set the value of the CLMD. The test instruction fetches the CLMD for the particular address, performs an AND operation with the CLMD and the mask, and compares the result. The test returns true if the bits in the mask are all set. The selective clear and selective set (422 and 424) performs selective clears or sets to the CLMD, respectively. Examples of hardware instruction definition pseudocode are shown below.

```
// (Helper pseudo-function.)
// Ensure the data for the cache line of data addressed by 'va' is valid in
// the cache; then return a reference to the line's CLMD.
private CLMD& clmd__va(VA va) {
    validate__line(va);
    return dcache.lines[line__va(va)].clmds[lp];
}
// CLMD__GET
// Return the current CLMD for the specified address 'va'.
instruction CLMD clmd__get(VA va) {
    return clmd__va(va);
}
// CLMD__SET
// Set the current CLMD for the specified address 'va'.
instruction void clmd__set(CLMD clmd, VA va) {
    clmd__va(va) = clmd;
}
// CLMD__TEST
// Return true if all of the specified CLMD bits for the CLMD for the
// specified address 'va' are set.
instruction bool clmd__test(CLMD clmd, VA va) {
    return (clmd__va(va) & clmd) == clmd;
}
// CLMD__AND
// Bitwise-AND the CLMD mask against the CLMD for the specified
address 'va'.
instruction CLMD clmd__and(CLMD clmd, VA va) {
    return clmd__va(va) &= clmd;
}
// CLMD__OR
// Bitwise-OR the CLMD mask against the CLMD for the specified
address 'va'.
instruction CLMD clmd__or(CLMD clmd, VA va) {
    return clmd__va(va) |= clmd;
}
```

In one implementation, the CLMD conditional store instruction 426 is used for bounded transactional memory systems, or for other purposes, as described in further detail herein. This instruction tests to see if the property that was set earlier is still present, and if so, stores the value and returns true. Otherwise, a false is returned and the value is not stored. In other words, data is stored at the address only if it has the particular CLMD address that is needed. An example of a conditional store set of hardware instruction definition pseudocode is shown below.

```
// CLMD__COND__STORE
//    (exemplary of one of a family of conditional store instructions, one
for each data type)
//
instruction bool clmd__cond__store(CLMD clmd, VA va, VALUE value) {
    atomic {
        if (clmd__test(clmd, va)) {
            *va = value;
            return true;
        }
        else {
            return false;
        }
    }
}
```

Alternatively or additionally to the individual instructions 412 for the CLMD, whole cache flash CLMD instructions 428 can be provided. For example, a flash clear (AND ALL) instruction 430 can be provided, along with a flash set (OR ALL) instruction 432. In the example hardware instruction definition pseudocode shown below, the CLMD_AND_ALL instruction is designed to flash clear all of the CLMDs for each logical processor, and the CLMD_OR_ALL instruction is designed to flash set all of the CLMDs for each logical processor.

```
// CLMD__AND__ALL
// Flash bitwise-AND the specified mask over all the current logical
// processor's CLMDs.
instruction void clmd__and__all(CLMD clmd) {
    for (int i = 0; i < NLINES; i++)
        dcache.lines[i].clmds[lp] &= clmd;
}
// CLMD__OR__ALL
// Flash bitwise-OR the specified mask over all the current logical
// processor's VAMDs
instruction void clmd__or__all(CLMD clmd) {
    for (int i = 0; i < NLINES; i++)
        dcache.lines[i].clmds[lp] |= clmd;
}
```

Figure 12:
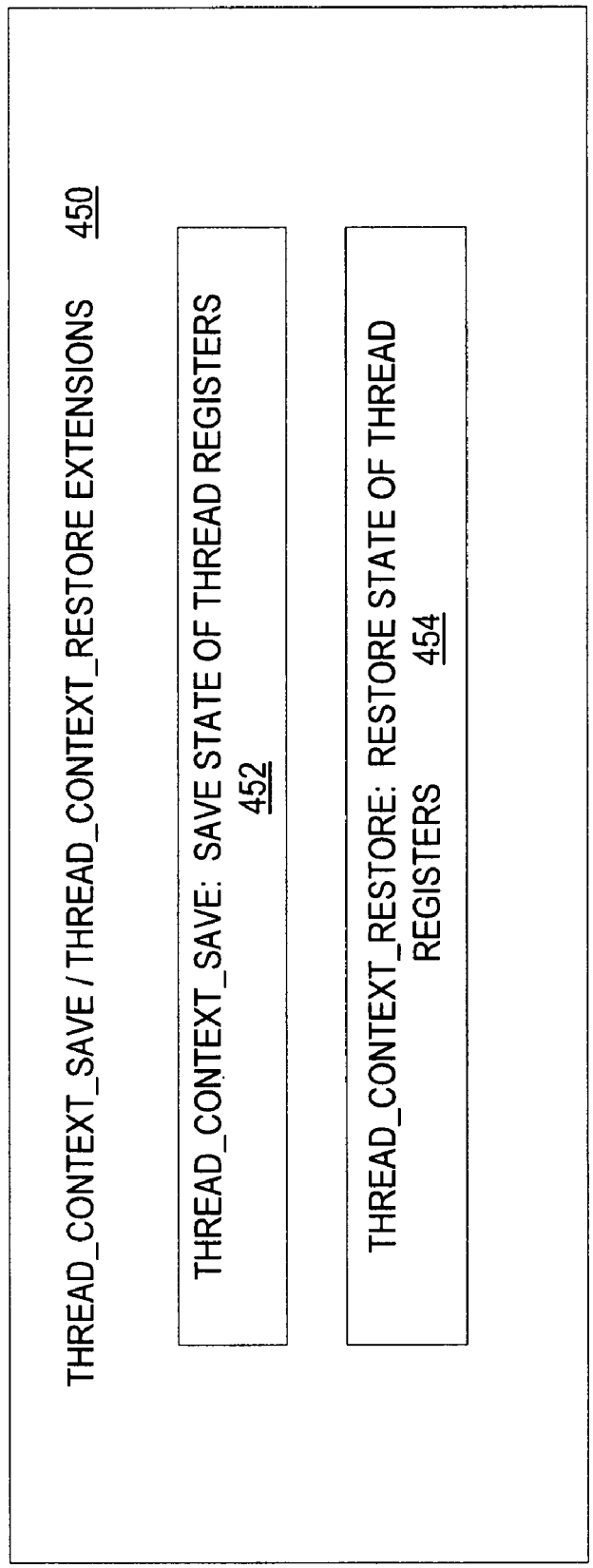
FIG. 12 is a diagrammatic view of exemplary context switch save and restore extensions for the central processing unit of FIG. 5.

FIG. 12 is a diagrammatic view of exemplary context switch save and restore extensions 450 for the central processing unit 200 of FIG. 5. These are used at context switch time to save and restore the thread context registers (e.g. the architected (programmer visible) thread stage, e.g. various general purpose register files, special registers, etc.). In one implementation, both of these instructions take a 512 byte context buffer as an argument. In one implementation, the context switch save and restore instructions can also save the logical processor's overall CMD state structure in some of the context buffer's currently reserved fields.

Turning now to FIGS. 13-26, some exemplary systems and techniques will be described that use some or all of the metadata, hardware instructions, and/or other techniques as described in FIGS. 1-12. FIGS. 13-16 illustrate some uses of the techniques described herein with a bounded transactional memory application. As described further in FIGS. 13-16, a bounded transactional memory application can use a programmable subset of the CLMD bits such that if any are ever set on a cache line, indicates that the line has transactionally read (and thus is watched for subsequent writes by other logical processors) or has been speculatively written in a transaction. Being speculatively written means that the line was written without knowledge yet if the values are actually going to be committed permanently or not. If such a speculatively written line is dirty and is then evicted, or read or written by another core, it is instead invalidated so that the writes are discarded. The bounded transactional memory application can also include an instruction that atomically tests a subset of the cache metadata CLMD eviction summary bits, and if no such evictions have occurred, atomically clears a subset of the CLMD bit(s) across all cache lines to commit permanently the speculative writes.

Figure 13:
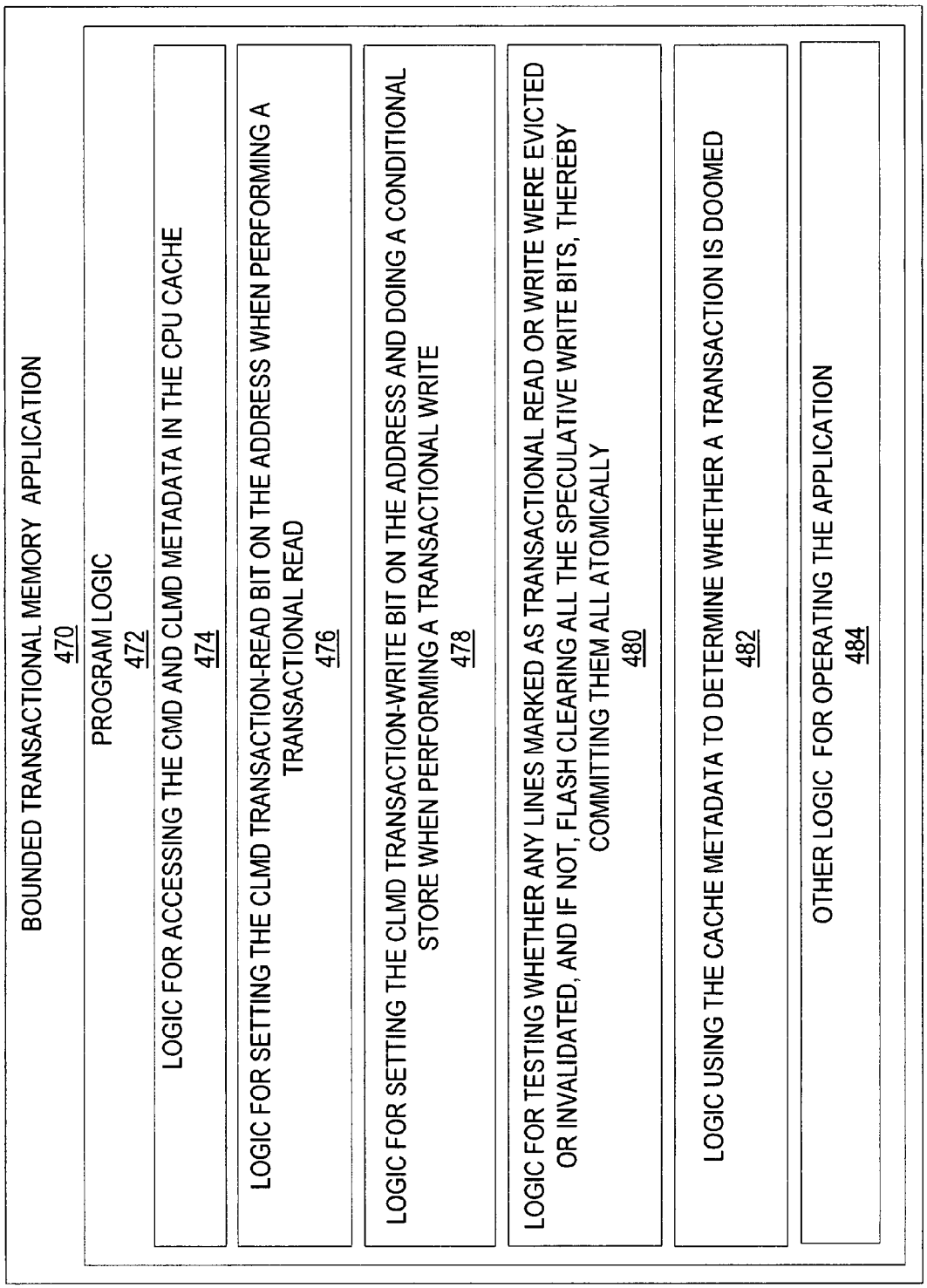
FIG. 13 is a diagrammatic view of a bounded transactional memory application of one implementation operating on the computer system of FIG. 1.

Turning now to FIG. 13, a diagrammatic view of a bounded transactional memory application of one implementation is shown. In one implementation, bounded transactional memory application 470 is one of the application programs that reside on computing device 100 (e.g. is one of hardware assisted software applications 150). However, it will be understood that bounded transactional memory application 470 can alternatively or additionally be embodied as computer-executable instructions on one or more computers and/or in different variations than shown on FIG. 1. Alternatively or additionally, one or more parts of bounded transactional memory application 470 can be part of system memory 104, on other computers and/or applications 115, or other such variations as would occur to one in the computer software art.

Bounded transactional memory application 470 includes program logic 472, which is responsible for carrying out some or all of the techniques described herein. Program logic 472 includes logic for accessing the CMD and CLMD metadata in the CPU cache 474; logic for setting the CLMD transaction read bit on the address when performing a transactional read 476; logic for setting the CLMD transaction write bit on the address and doing a conditional store when performing a transactional write 478; logic for testing whether any lines marked as transactional read and write were evicted or invalidated, and if not, flash clearing all the speculative write bits, thereby committing them all atomically 480; logic for accessing the metadata to determine whether a transaction is doomed 482; and other logic for operating the application 484. In one implementation, program logic 472 is operable to be called programmatically from another program, such as using a single call to a procedure in program logic 472.

Figure 14:
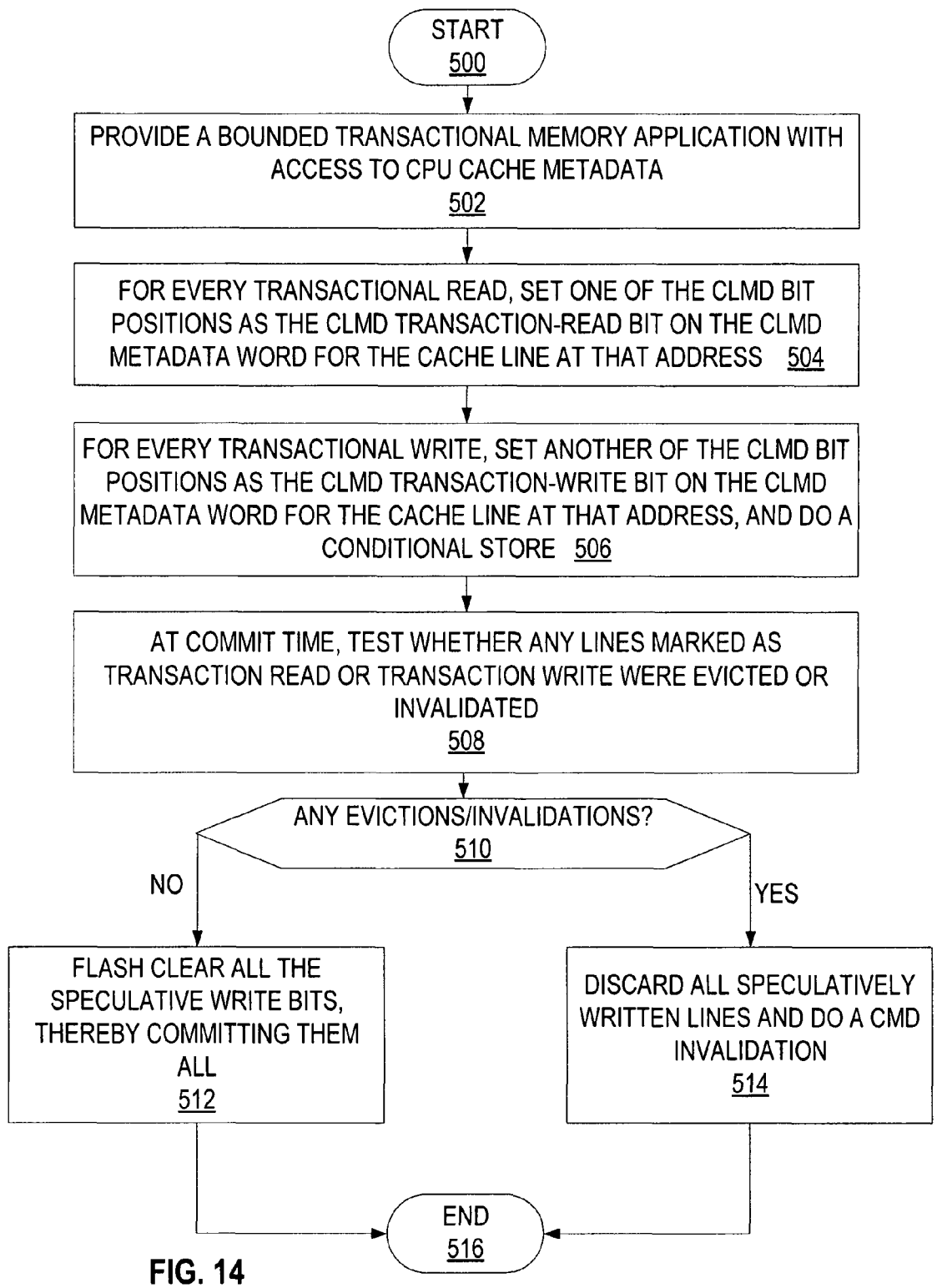
FIG. 14 is a process flow diagram for one implementation of the system of FIG. 1 that illustrates the stages involved in providing a bounded transactional memory application using cache metadata.

FIG. 14 illustrates one implementation of the stages involved in providing a bounded transactional memory application using cache metadata. In one form, the process of FIG. 14 is at least partially implemented in the operating logic of computing device 100. The process begins at start point 500 with the system providing a bounded transactional memory application with access to CPU cache metadata (stage 502). For every transactional read, the system sets one of the CLMD bit positions (for example, CLMD[0]), as the CLMD transaction-read bit on the CLMD metadata word for the cache line at that address (stage 504). For every transactional write, the system sets another of the CLMD bit positions (for example CLMD[1]), as the CLMD transaction-write bit on the CLMD metadata word for the cache line at that address, and does a conditional store (stage 506). At commit time, the system tests whether any lines marked as CLMD transaction-read or CLMD transaction-write were evicted or invalidated (stage 508). If no evictions/invalidations are found (decision point 510), then all the speculative write bits are flash cleared, thereby committing them all (stage 512). If any evictions/invalidations are found (decision point 510), then all speculatively written lines are discarded and a CMD invalidation is done to reset all CLMDs and eviction data for the transaction (stage 514). The process ends at end point 516.

This algorithm correctly implements bounded transactional memory for concurrent transactions that that fit in the caches of each logical processor. Since every transactional read of data is explicitly annotated by software with a transaction-read bit on its cache line, and since every speculative transactional write of data is explicitly annotated by software with a transaction-write bit on its cache line, a transaction will only commit if during the time interval of execution, there were no conflicting accesses to data from other logical processors—in particular, if there were no writes (by other logical processors) of data read in the transaction, and if there were no reads (by other logical processors) of data written in the transaction. For if a conflicting access occurs, the behavior of multiprocessor cache coherence is to invalidate this transaction's logical processor's cached copy of the data, an event which due to behavior (258) is manifest as an eviction/invalidation of non-zero CLMD data in the clmd_evictions register in the CMD (190). Furthermore, the algorithm correctly watches for any cache line eviction of the entirety of any transactionally accessed data in the time interval from each first reference up to the transaction commit attempt. If (as occurs during program execution) a cache miss occurs and a cache line must be evicted, and this cache line has CLMD cache metadata with transaction-read or transaction-write bits set, this event is also manifest via (258) as an eviction/invalidation in the clmd_evictions register. In either case, the combination of software and hardware detects either any transaction conflict or capacity problem and thus guarantees correct transactional memory semantics.

Figure 15:
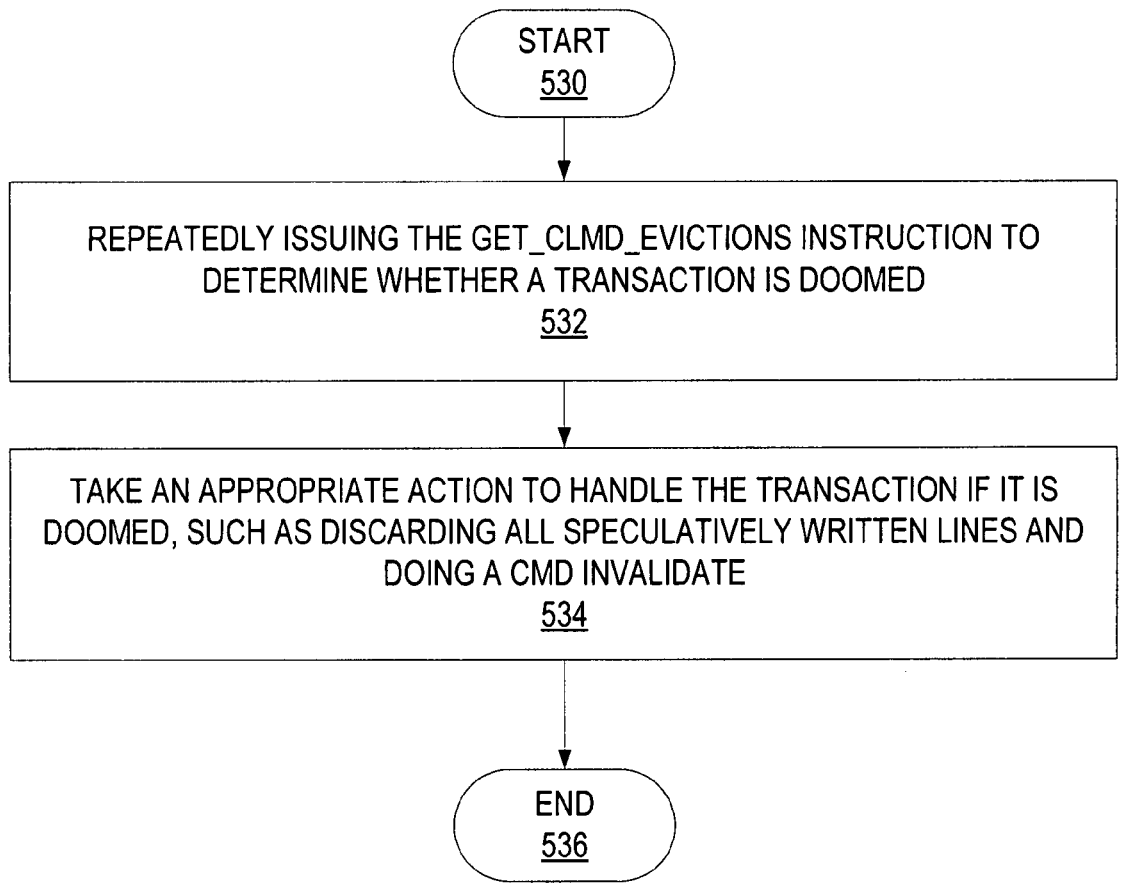
FIG. 15 is a process flow diagram for one implementation of the system of FIG. 1 that illustrates the stages involved in using the get CLMD evictions instruction to poll whether a transaction is doomed.

FIG. 15 illustrates one implementation of the stages involved in using the CLMD evictions instruction to poll whether a transaction is doomed due to conflicting access or capacity. In one form, the process of FIG. 15 is at least partially implemented in the operating logic of computing device 100. The process begins at start point 530 with repeatedly issuing the GET_CLMD_EVICTIONS instruction to determine whether a transaction is doomed (stage 532). An appropriate action is taken to handle the transaction if it is doomed, such as discarding all speculatively written lines and doing a CMD invalidate (stage 534). The process ends at end point 536.

Figure 16:
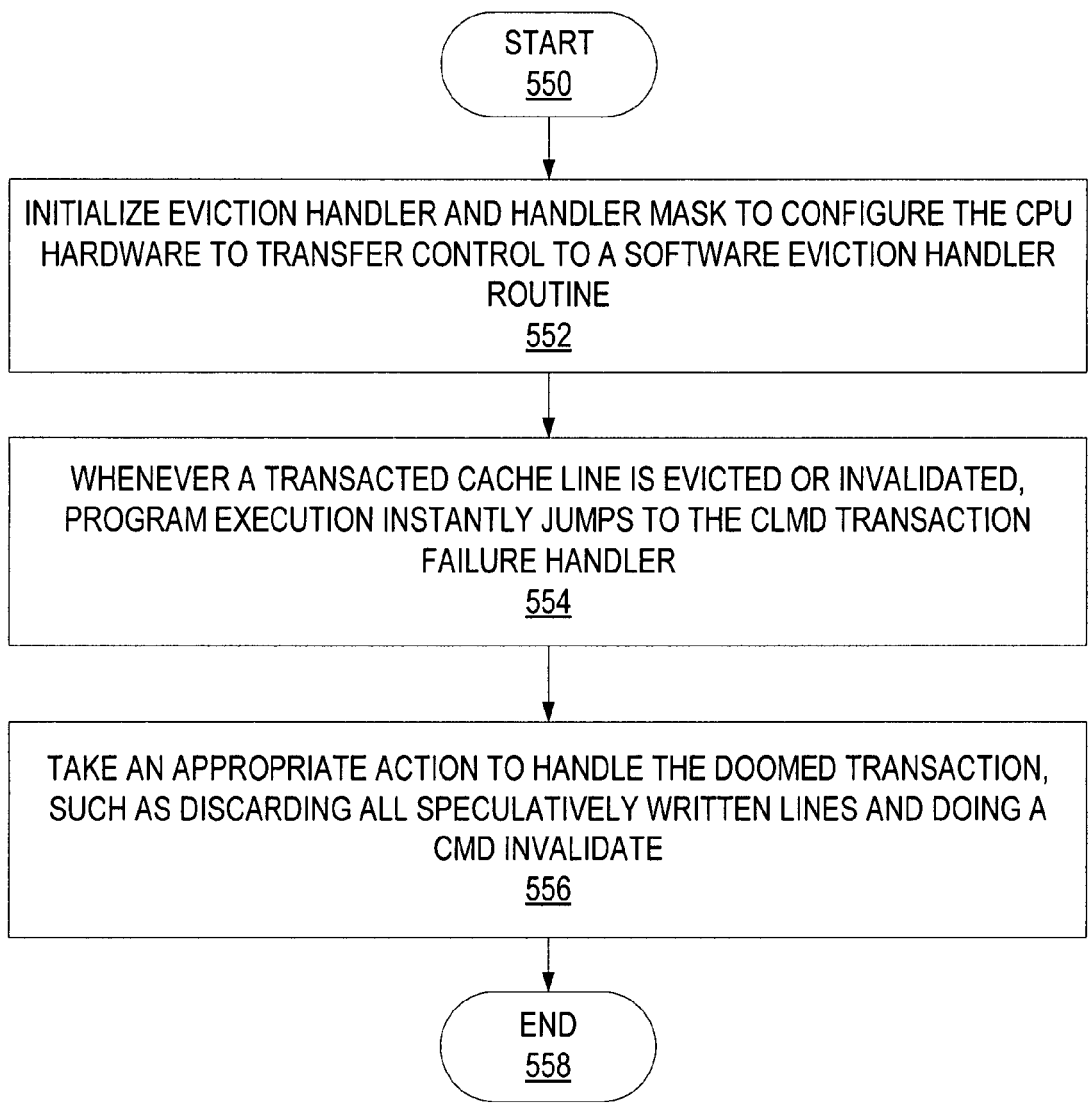
FIG. 16 is a process flow diagram for one implementation of the system of FIG. 1 that illustrates the stages involved in using an addition to the CMD structure to handle doomed transactions in hardware.

FIG. 16 illustrates one implementation of the stages involved in using an addition to the CMD structure to handle doomed transactions in hardware. In one form, the process of FIG. 16 is at least partially implemented in the operating logic of computing device 100. The process begins at start point 550 with initialization of the eviction handler and handler mask (stage 552). Using CLMD_SET_EVICTION_HANDLER and CLMD_SET_EVICTION_HANDLER_MASK instructions to initialize the clmd_eviction_handler and clmd_eviction_handler_mask CMD control registers, software configures the CPU hardware to transfer control to a software eviction handler routine the moment a cache line with CLMD bit transaction-write is evicted or invalidated (stage 552). Whenever such a transacted cache line is evicted or invalidated, program execution instantly jumps to the CLMD transaction failure handler (stage 554). An appropriate action is taken to handle the doomed transaction, such as discarding all speculatively written lines and doing a CMD invalidate (stage 556). The process ends at end point 558.

Some implementations may prevent recursive invocation of the handler by clearing the eviction_handler mask as the handler is first invoked. Turning now to FIGS. 17-22, a hardware accelerated software transactional memory system that uses cache metadata is described. In one implementation, the cache metadata is used by the software transactional memory system to accelerate some expensive aspects of such a system, such as redundant open_read barrier filtering, redundant write_undo barrier filtering, read log validation, retry operations, and these operations with nested transactions.

In the example software transactional memory system described herein, data's transaction status is described with reference to a transactional memory word (TMW). A TMW describes the transactional synchronization status for associated data that may be accessed in a transaction. For example, the TMW can include a version number, and/or a pointer to a transaction that has the data open for write, and/or a list/count and/or indicator of transactional readers (e.g. pessimistic readers). In one implementation, the list/count and/or indicator of readers can include a count of the number of readers (e.g. pessimistic) accessing the particular value at a given point in time. In another implementation, the list/count and/or indicator of readers can include a list of the particular readers (e.g. pessimistic) accessing the particular value at a given point in time. In yet another implementation, the list/count and/or indicator of readers is simply a flag or other indicator to indicate that there are one or more readers (e.g. pessimistic) accessing the particular value at a given point in time. These are just examples, and the use of the term TMW herein is meant to cover a variety of mechanisms for tracking lock statuses.

Figure 17:
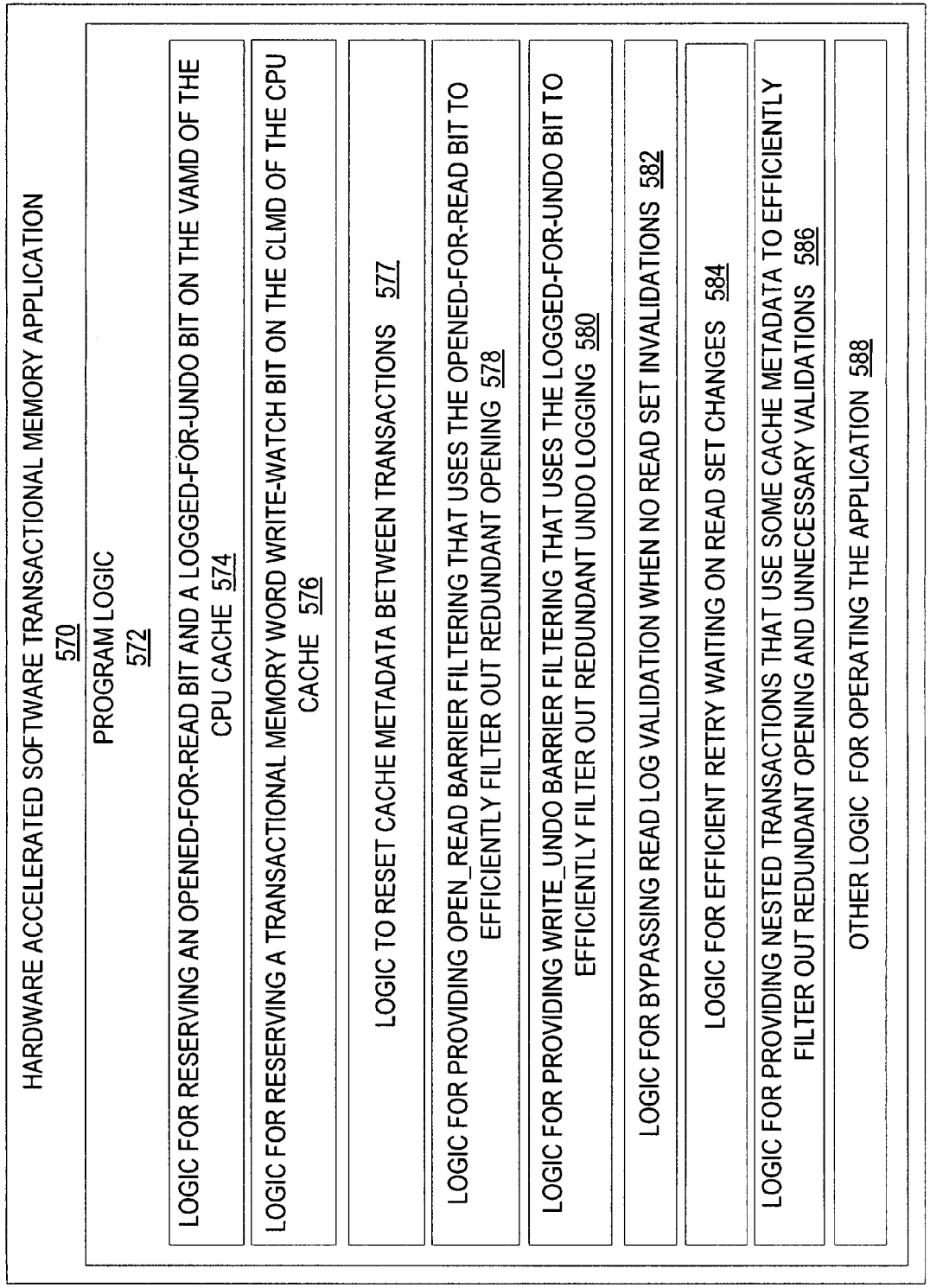
FIG. 17 is a diagrammatic view of a hardware accelerated software transactional memory application of one implementation operating on the computer system of FIG. 1.

Beginning with FIG. 17, a diagrammatic view of a hardware accelerated software transactional memory application is shown for one implementation operating on the computer system of FIG. 1 (e.g. as one of hardware assisted software applications 150). Hardware accelerated software transactional memory application 570 includes program logic 572, which is responsible for carrying out some or all of the techniques described herein. Program logic 572 includes logic for reserving an opened-for-read bit and a logged-for-undo bit on the VAMD of the CPU cache 574; logic for reserving a TMW write-watch bit on the CLMD of the CPU cache 576; logic to reset cache metadata between transactions 577; logic for providing Open_Read barrier filtering that uses the opened-for-read bit to avoid redundant read logging 578; logic for providing Write_Undo barrier filtering that uses the logged-for-undo bit to avoid redundant undo logging 580; logic for bypassing read log validation when there have been no read set invalidations (e.g. no writes from other threads to data this transaction has read) 582; logic for providing retry operations that mark CLMD lines 584; logic for providing nested transactions that use some cache metadata to avoid redundant filtering and unnecessary validations 586; and other logic for operating the application 588. These operations will now be described and/or defined in further detail in FIGS. 18-22.

As cache metadata state is used to accelerate filtering and bypassing away of various redundant or unnecessary transactional memory barriers and bookkeeping operations, and for other purposes, it is usually helpful to reset all cache metadata to zero between transactions so that one transaction's filter and write watch state does not impact some later transaction's filter and watch logic (577). In one form, all compressed metadata state may be quickly reset with a short sequence of instructions such as CLMD_AND_ALL and VAMD_AND_ALL, issued either before the transaction begins or immediately after it ends.

Figure 18:
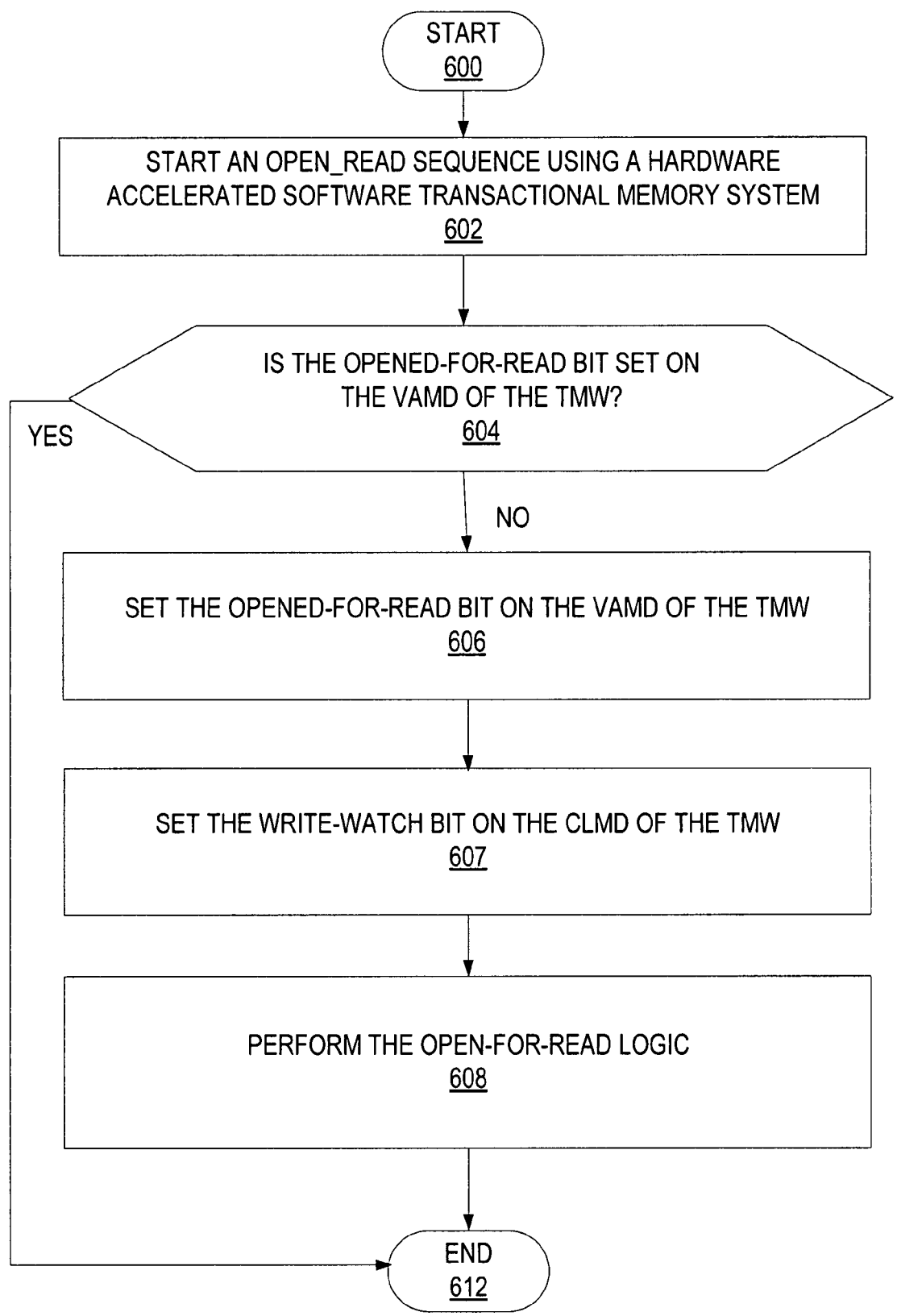
FIG. 18 is a process flow diagram for one implementation of the system of FIG. 1 that illustrates the stages involved in providing Open_Read barrier filtering that uses the opened-for-read bit on the VAMD of the CPU cache to avoid redundant filtering.

FIG. 18 illustrates one implementation of the stages involved in providing Open_Read barrier filtering that uses the opened-for-read bit position on the VAMDs of the cache metadata to efficiently filter out redundant transactional read logging. In one form, the process of FIG. 18 is at least partially implemented in the operating logic of computing device 100. The process begins at start point 600 with the system starting an Open_Read sequence using a hardware accelerated software transactional memory system (stage 602). If the VAMD opened-for-read bit is already set for the address of the TMW (decision point 604), this indicates this TMW has already been opened for read in this transaction, and software jumps over the read barrier logging sequence (stages 606, 607, 608). Otherwise the system sets the opened-for-read bit on the VAMD of the address of the TMW (stage 606) and performs the transactional Open_Read logic. In one form, this logs the read access. In one form, stage 604 may be implemented with a VAMD_TEST instruction followed by a conditional jump, and stage 606 may be implemented with a VAMD_SET or VAMD_OR instruction. In another form, stage 604 and 606 may together be implemented with a single VAMD_TSET instruction (test then set) followed by a conditional jump. In stage 607, the system also sets a TMW write-watch bit on the CLMD metadata for the TMW's cache line. Stage 607 may be implemented with a CLMD_SET or CLMD_OR instruction. The process ends at end point 612.

Figure 19:
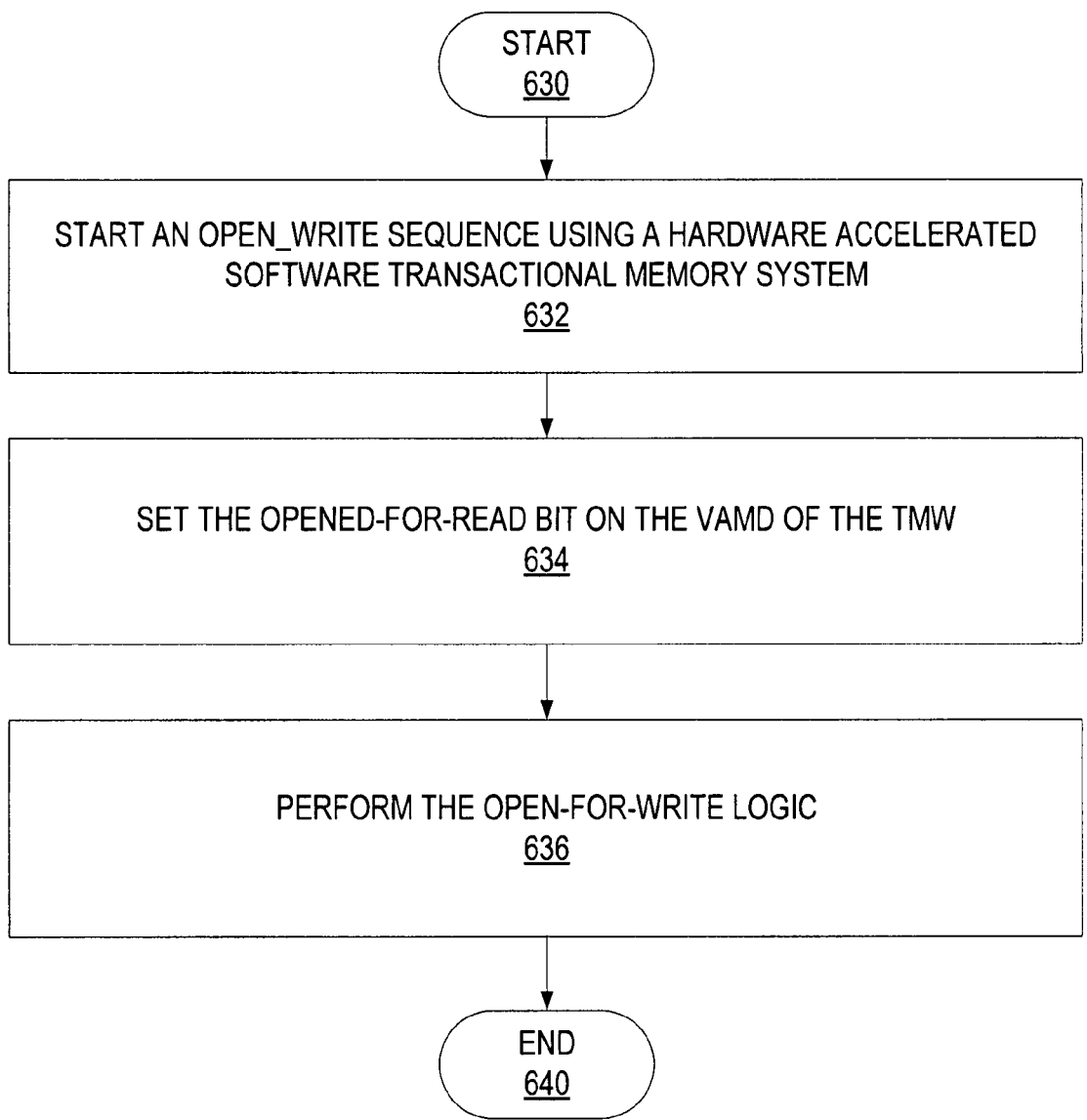
FIG. 19 is a process flow diagram for one implementation of the system of FIG. 1 that illustrates the stages involved in providing Open_Write barrier filtering that uses the TMW bit on the CLMD of the CPU cache.

FIG. 19 illustrates one implementation of the stages involved in an Open_Write barrier that complements the just described cache metadata based Open_Read filtering. In one form, the process of FIG. 19 is at least partially implemented in the operating logic of computing device 100. The process begins at start point 630 with the system starting an Open_Write sequence using a hardware accelerated software transactional memory system (stage 632). In one form, opening a TMW for write also grants read access. Therefore the system sets the opened-for-read bit on the VAMD of the TMW using the VAMD_SET instruction (stage 634). Then the system performs the transactional Open_Write logic (stage 636). For example, in one form, the TMW is overwritten with a pointer to this transaction object (indicating it owns the TMW's object(s) data for writing). In another form, the TMW is overwritten with a pointer to an entry in a transactional object write log. In either of these forms, a bit in the TMW is changed that indicates the TMW is opened for write by a transaction. The process ends at end point 640.

Figure 20:
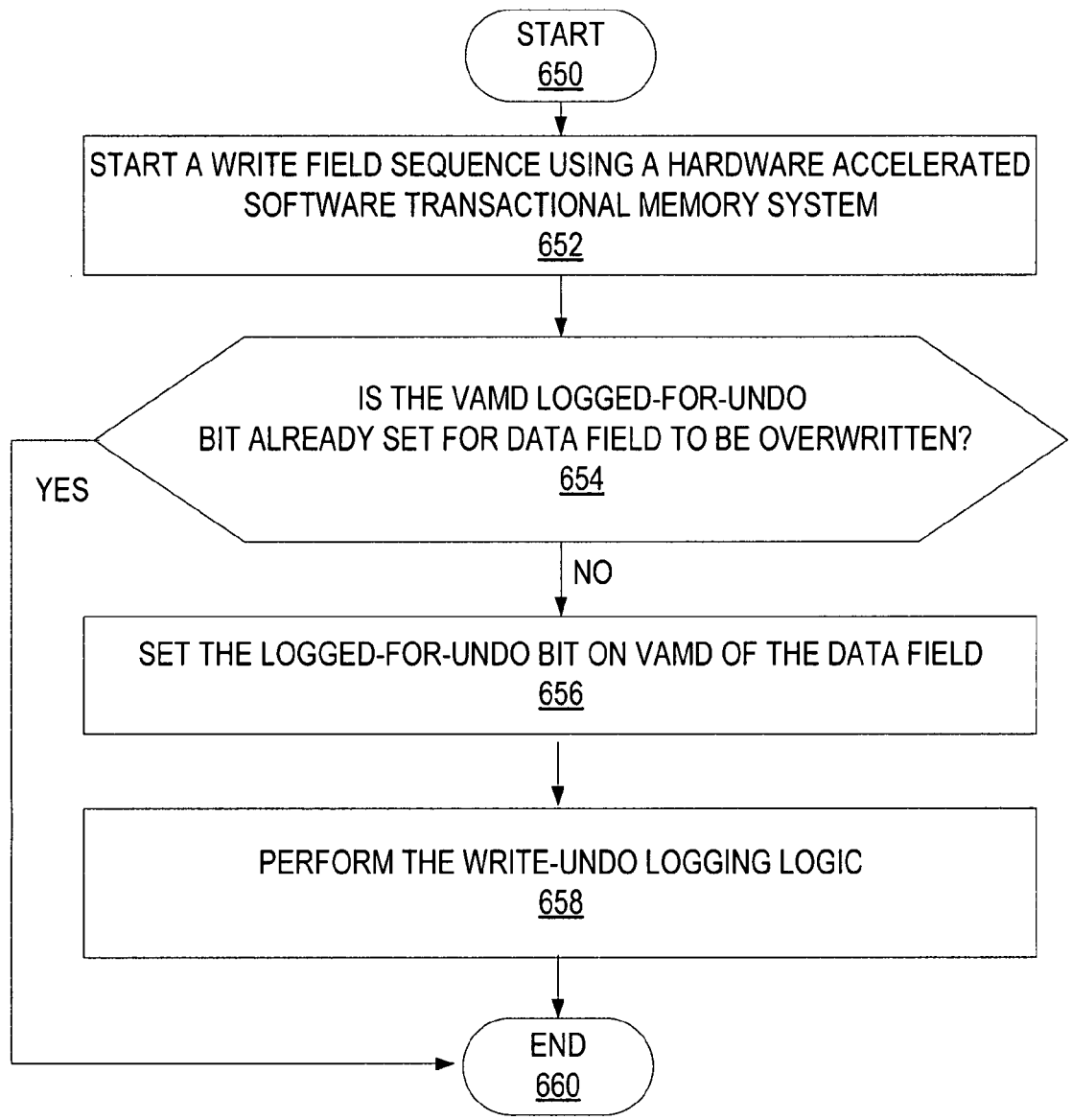
FIG. 20 is a process flow diagram for one implementation of the system of FIG. 1 that illustrates the stages involved in providing Write_Undo barrier filtering that uses the logged-for-undo bit to efficiently filter out redundant undo logging.

FIG. 20 illustrates one implementation of the stages involved in providing Write_Undo barrier filtering that uses a logged-for-undo bit position in the VAMD cache metadata to efficiently filter out redundant undo logging. In one form, the process of FIG. 20 is at least partially implemented in the operating logic of computing device 100. The process begins at start point 650 with the system starting a write field sequence using a hardware accelerated software transactional memory system (stage 652). If the VAMD logged-for-undo bit is already set for the address of the data field to be overwritten (decision point 654), then software jumps over the write undo logging sequence (stages 656, 658). Otherwise the system sets the logged-for-undo bit on the VAMD of the address of the data field (656) and performs Write_Undo logging logic (stage 658). In one form, the granularity of the VAMD metadata is per aligned quadword of data. Since that is the granularity of cache metadata based write undo filtering, therefore Write_Undo logging logic copies an aligned quadword of data to the log, even if the data field itself is smaller than a quadword. In one form, stage 654 may be implemented with a VAMD_TEST instruction followed by a conditional jump, and stage 656 may be implemented with a VAMD_SET or VAMD_OR instruction. In another form stage 654 and stage 656 may together be implemented with a single VAMD_TSET instruction (test then set) followed by a conditional jump. The process ends at end point 660.

Figure 21:
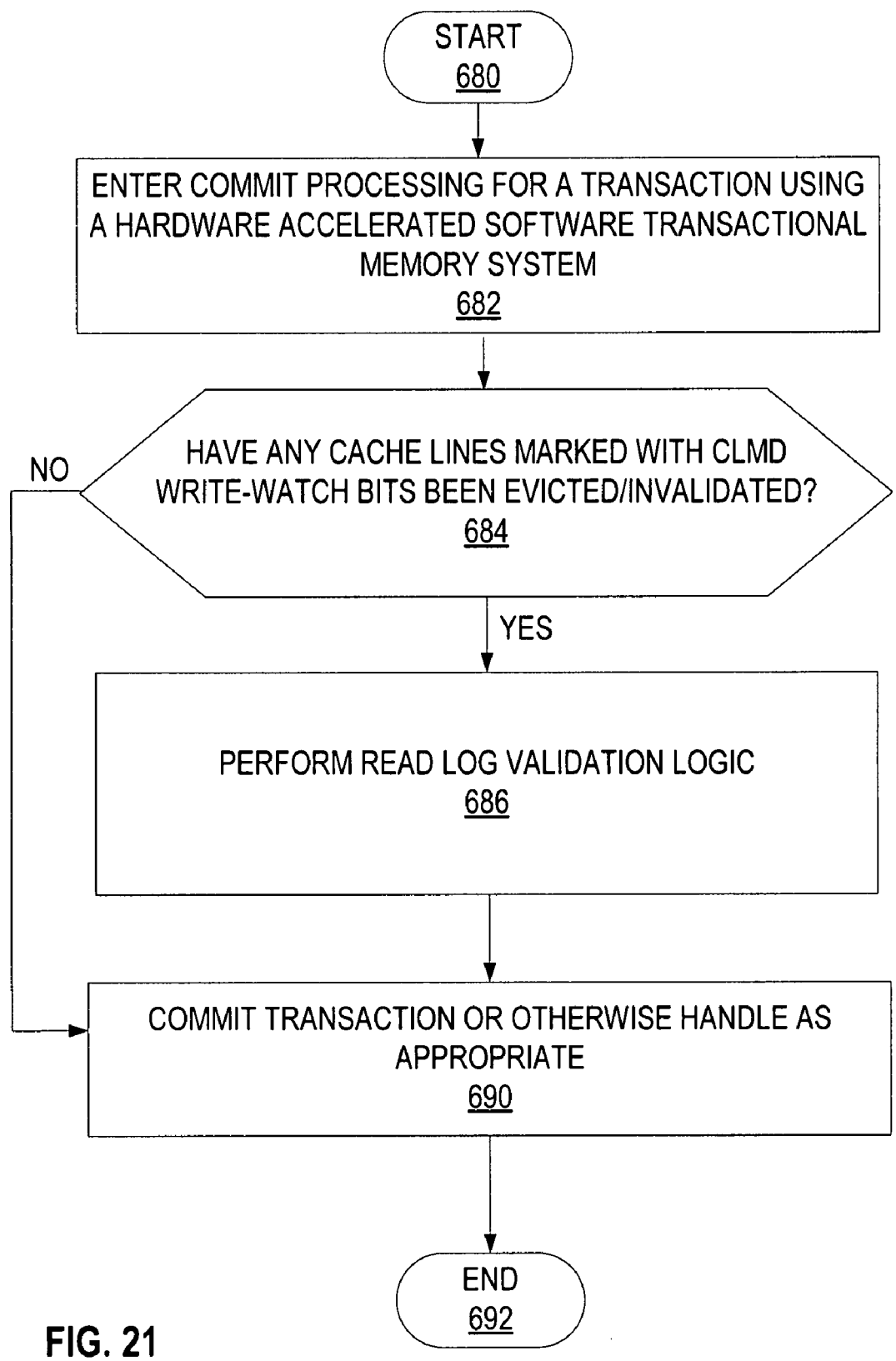
FIG. 21 is a process flow diagram for one implementation of the system of FIG. 1 that illustrates the stages involved in providing read log validation that uses the get CLMD evictions instruction on the CPU to avoid unnecessary read log validations.

FIG. 21 illustrates one implementation of the stages involved in providing read log validation that uses the GET_CLMD_EVICTIONS instruction to bypass read log validation when there have been no read set invalidations (e.g. no conflicting writes from other threads to data this transaction has read). In one form, the process of FIG. 21 is at least partially implemented in the operating logic of computing device 100. The process begins at start point 680 with the system entering commit processing for a transaction using a hardware accelerated software transactional memory system (stage 682). The system then checks whether any cache lines marked with the CLMD write-watch bit were evicted or invalidated while in this transaction. In one form, software issues the GET_CLMD_EVICTIONS instruction to retrieve the evictions summary and tests the write-watch bit; if it is zero, no watched line was evicted or overwritten by another thread. It follows this transaction's read set never suffered a conflicting write access from another thread, and it is safe to skip expensive read log validation. In that case, software conditionally jumps over the read log validation stage (stage 686). If the write-watch bit in the evictions summary is set, software performs read log validation (stage 686) as usual. In either event, the transactions are committed or otherwise handled as appropriate (stage 692). The process ends at end point 692.

Figure 22:
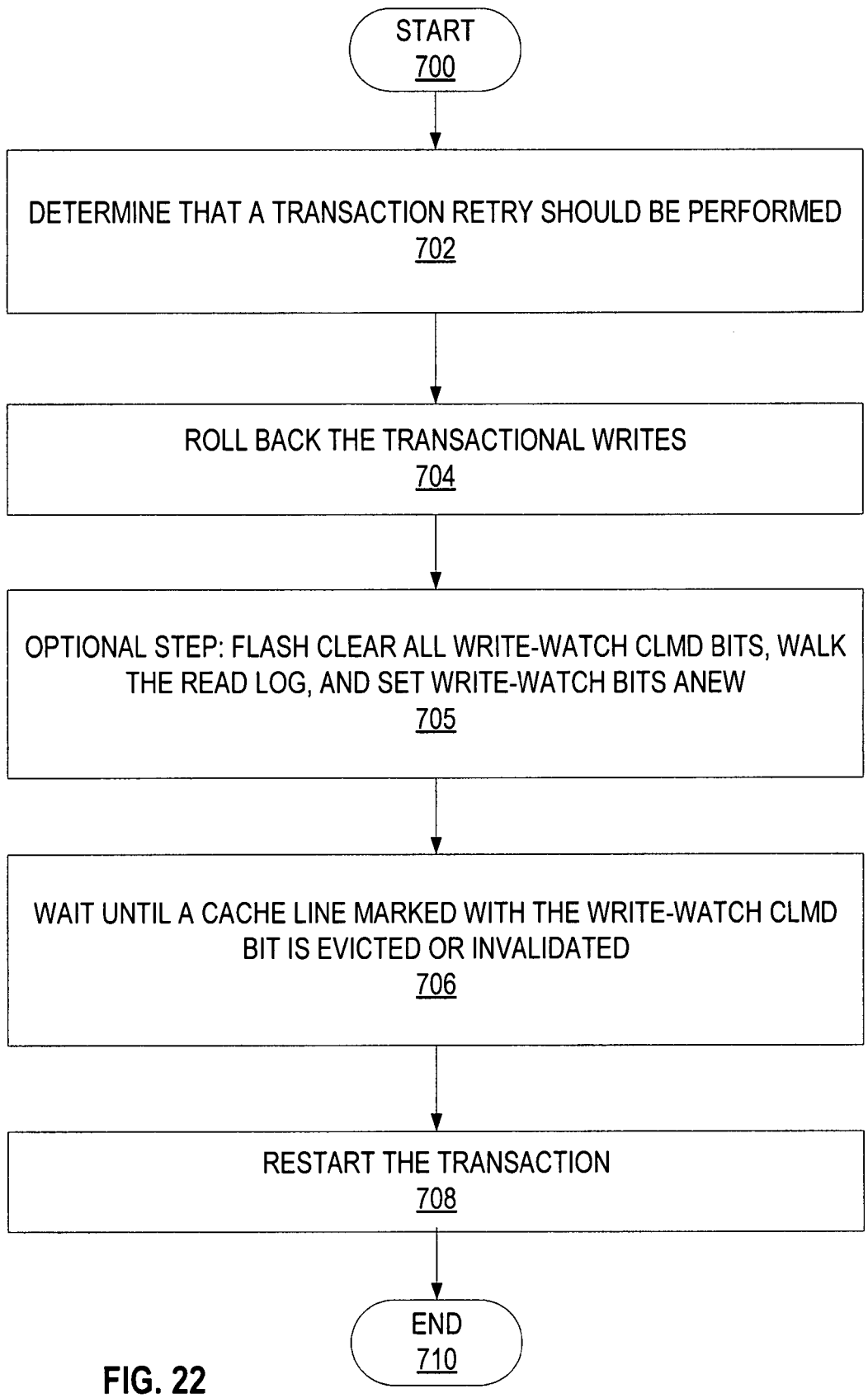
FIG. 22 is a process flow diagram for one implementation of the system of FIG. 1 that illustrates the stages involved in providing retry operations that mark CLMD lines.
Figure 23:
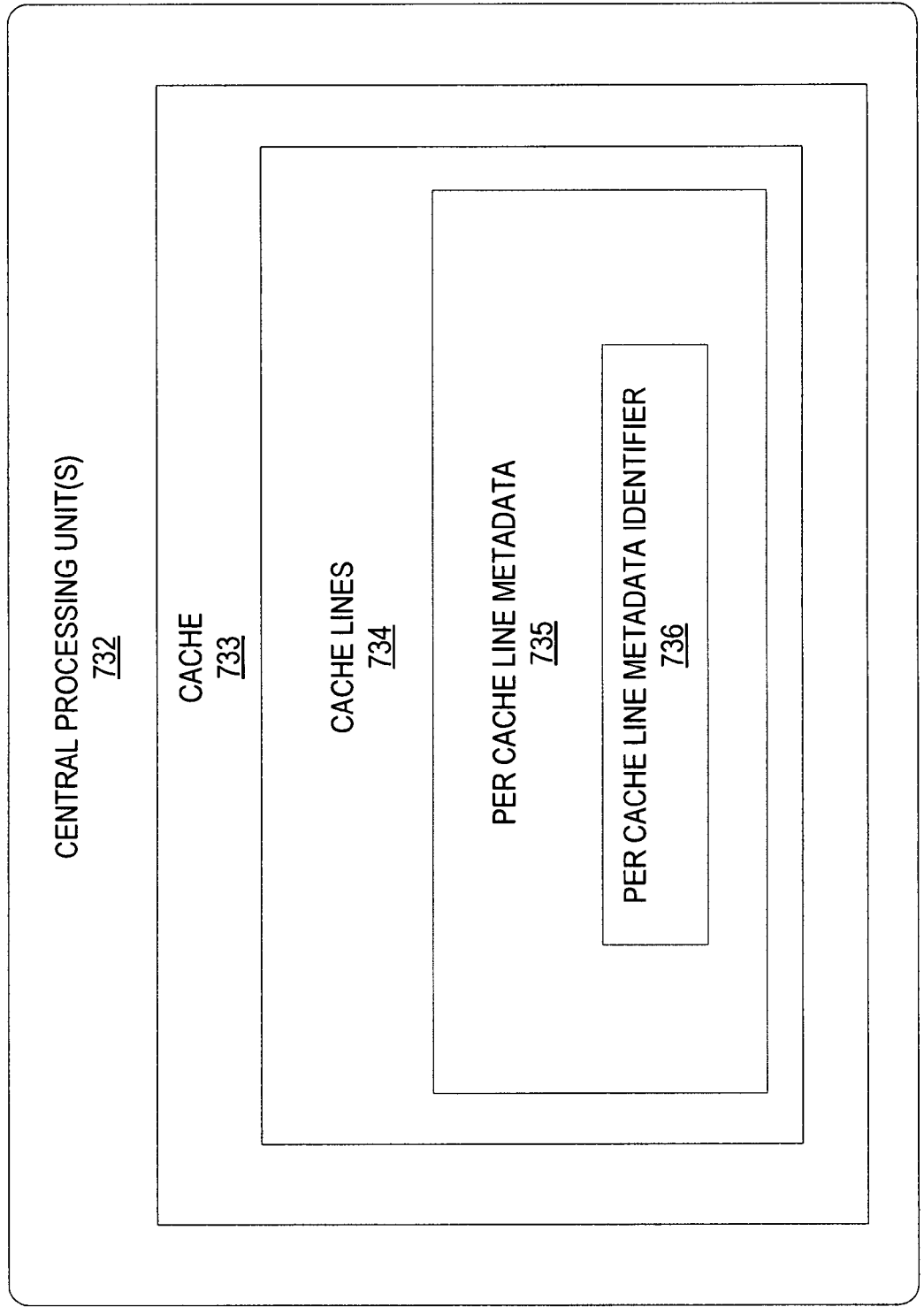
FIG. 23 is a diagrammatic view of a central processing unit of one implementation that illustrates a cache with per cache line metadata and a per cache line metadata identifier.

FIG. 22 illustrates one implementation of the stages involved in providing retry operations that mark CLMD lines. In one form, the process of FIG. 22 is at least partially implemented in the operating logic of computing device 100. The process begins at start point 700 with determining that a transaction retry operation should be used in a hardware accelerated software transactional memory system (stage 702). The system rolls back updates to data written in the transaction and releases any data write locks it may hold (stage 704). The system then employs the CLMD write-watch bits previously set (stage 607) to reduce the overhead of waiting, improve the latency of resuming, the transaction after another thread updates (writes) the data (stage 706). In one implementation it does this by polling the CLMD cache eviction using the GET_CLMD_EVICTIONS instruction to interrogate the evictions summary and then test for evictions of CLMDs. In another implementation software uses the CLMD_SET_EVICTION_HANDLER and CLMD_SET_EVICTION_HANDLER_MASK instructions to initialize the eviction handler to transfer program control to a retry-wakeup handler the moment a cache line with CLMD bit transaction-write is evicted or invalidated (written) by another thread. The thread can then be put to sleep, in one form via a spin-loop or in another by executing a pause instruction to enter a lower power state. When any write-watch-metadata annotated line is evicted or invalidated, the system then wakes up the waiting transaction and retries it again (stage 708). The process ends at end point 710. In another implementation, optional stage 705 may also be performed. Using CLMD_AND_ALL, software zeroes the write-watch bit position on all CLMDs in the cache metadata. Software then loops over every read log entry in the read log, re-establishing a write-watch CLMD bit on the cache line of the TMW address found in each read log entry.

Turning now to FIGS. 23-35, several figures will be used to illustrate how cache metadata can be flexibly allocated and shared among multiple processors and/or subsystems using metadata identifiers. The term "metadata identifier" (MDID) as used herein is meant to include a value that identifies a particular usage context, instance, or subset of cache metadata. FIGS. 23-30 illustrate some exemplary hardware that can be used to provide the cache metadata and the metadata identifiers. FIGS. 31-35 then illustrate some exemplary uses of the cache metadata and metadata identifiers.

Let's start with FIGS. 23-30 to describe some exemplary hardware. It will be appreciated that these hardware diagrams are just examples, and that numerous other configurations are also possible. For example, in other configurations, fewer and/or additional types of software accessible metadata can be used in different arrangements than shown in FIGS. 23-30. Beginning with FIG. 23, one or more exemplary central processing units 732 are shown with a cache 733 that has per cache line metadata 735 and a per cache line metadata identifier 736. The usage of the per cache line metadata identifier 736 is described in further detail in FIGS. 27-35.

Figure 24:
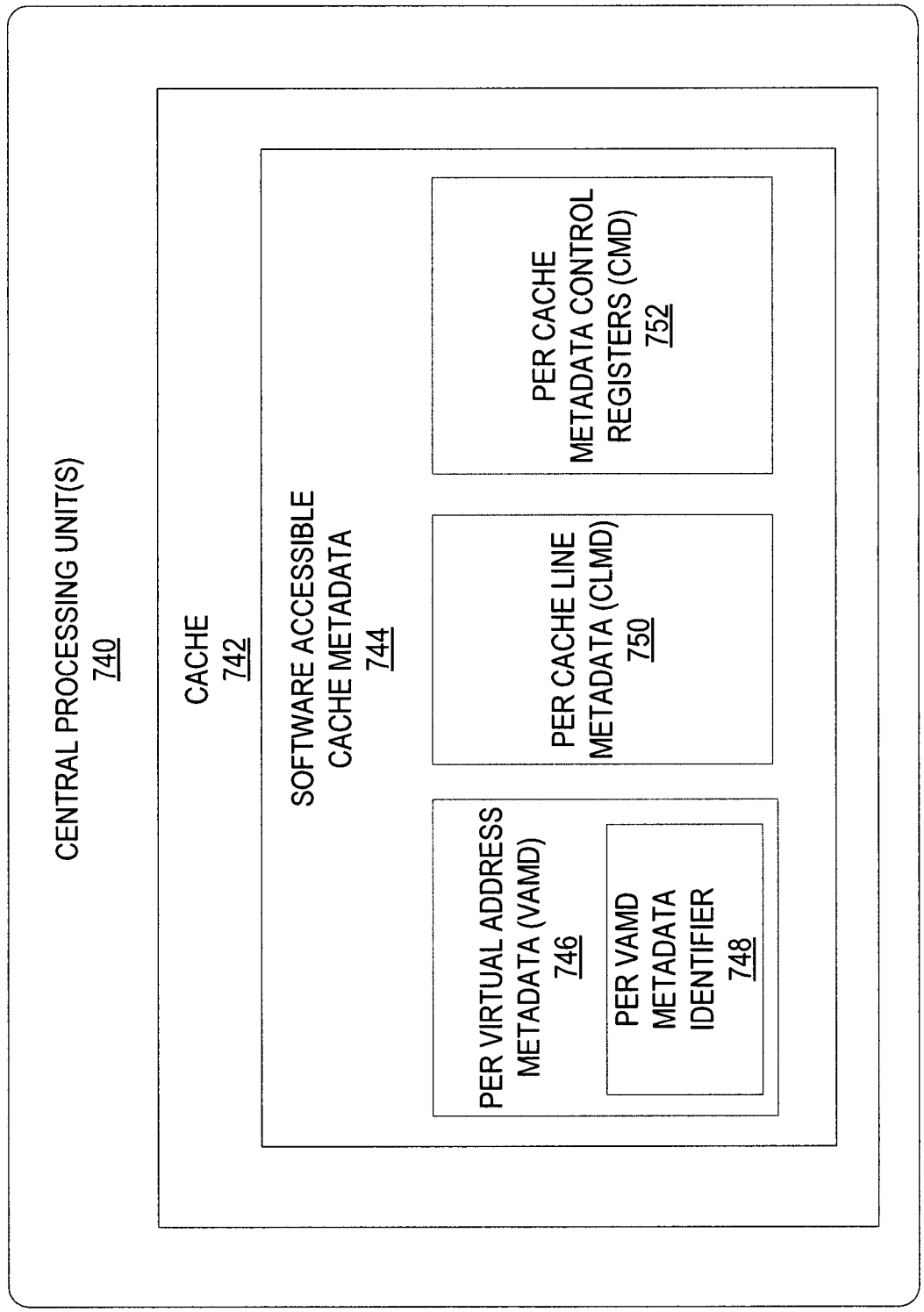
FIG. 24 is a more detailed diagrammatic view of a central processing unit of one implementation that illustrates a cache with software accessible cache metadata that includes a metadata identifier.
Figure 25:
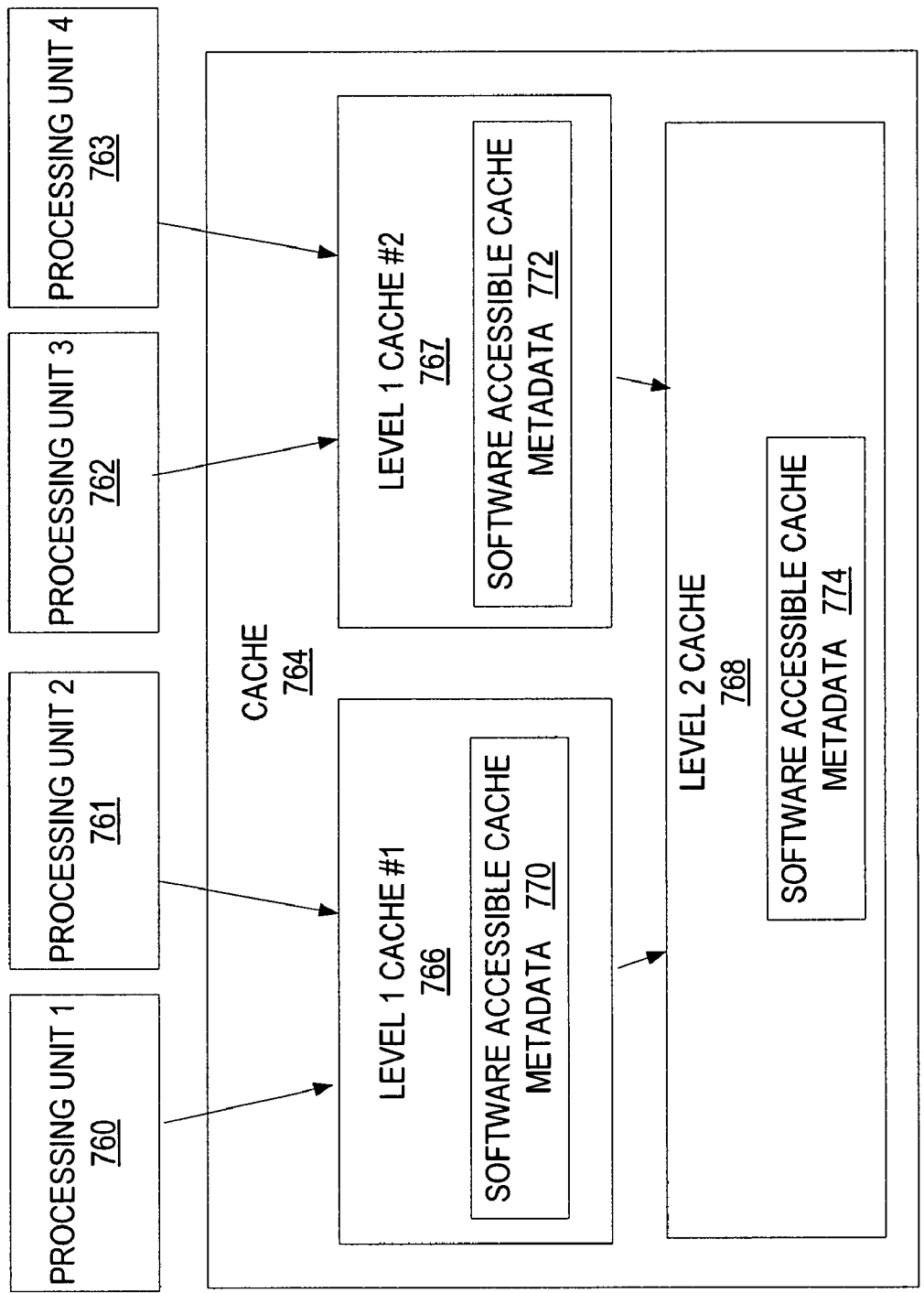
FIG. 25 is a diagrammatic view of one implementation of an advanced cache system consisting of multiple caches and cache levels, with some processing units sharing a same cache with software accessible cache metadata.

FIG. 24 is a more detailed diagrammatic view that illustrates one or more exemplary central processing units 740 having a cache 742 with software accessible cache metadata 744. The software accessible cache metadata includes per virtual address metadata (VAMD) 746, per cache line metadata (CLMD) 750, and per cache metadata control registers (CMD) 752. The per virtual address metadata 746 also includes per VAMD metadata identifiers 748. Similarly, FIG. 25 illustrates a multiprocessor with an advanced cache system consisting of multiple cache blocks and cache levels. Processing units (760, 761) share level one cache #1 (766); processing units (762, 763) share level one cache #2 (767); and the two level one caches (766, 767) share, and are backed up by, a level two cache (768) that is in effect shared by all four processing units (760-763). Each cache (766, 767, 768) has software accessible cache metadata (770, 772, 774, respectively). As with FIG. 24 (746, 748), the software accessible cache metadata includes per virtual address metadata (VAMD), per cache line metadata (CLMD), and per cache metadata control registers (CMD), which are not shown in FIG. 25 for the sake of simplicity. In one implementation, the per virtual address metadata (VAMD) also include per VAMD metadata identifiers, which are described in further detail herein. It will be appreciated that this specific topology of four processing units and a two level cache system is just one example, and that numerous other configurations are also possible. As a few non-limiting examples, the topology could be comprised of a greater or lesser number of processors; with greater or fewer levels of caches, or with more or less or no sharing of caches amongst processors; or with some of the processors implemented as distinct CPU chips or cores or implemented as hardware thread contexts in a multithreaded CPU core, or with software accessible cache metadata present in only some of the caches.

Furthermore, it will be appreciated that there are various ways for assigning per VAMD metadata identifiers and/or for restricting the associated accesses to the cache metadata (770, 772, 774). As one non-limiting example, metadata identifiers can be assigned by trusted code, such as the operating system. In such a scenario, all accesses could be "implicit" with the current metadata identifier. Implicit use of metadata identifiers is described in further detail in FIGS. 27 and 28. As a second non-limiting example, the hardware can associate some kind of process identifier with the metadata identifier so that the metadata values written by threads in one process are not accessible to other processes. As a third non-limiting example, processes that share memory can take steps to co-ordinate their use of the metadata identifiers, such as by using some application-specific data structure in the memory that they share. A fourth non-limiting example includes making access to metadata conditional on the same access control settings that protect the underlying data. For example, if a process has read-only access to a piece of data then it may read (but not update) metadata associated with it. This means that processes granted shared read-only access to a piece of data cannot communicate via metadata associated with it. Various other hardware and/or software-based approaches could also be used to assign the metadata identifiers and/or to restrict the associated accesses to cache metadata.

FIG. 26 is a diagrammatic view of one implementation that illustrates an exemplary data cache that has been enhanced with CLMD and VAMD cache metadata, and with metadata identifiers. The diagram illustrates some of the state (data and metadata) retained in the cache. In the exemplary state 776 shown, each virtual address metadata (VAMD) of each quad-word of the cache line of each logical processor is allocated four bits of metadata, and each cache line metadata (CLMD) of each cache line of each logical processor is allocated eight bits of metadata. These bit allocations are exemplary in nature, and other allocations could be used in other implementations. Furthermore, in the example shown in FIG. 26 and discussed herein, a VAMD is assigned to each 64-bit quadword of data in the cache line. However, it will be appreciated that in other implementations, some block of data smaller or larger than a quadword could correspond to each VAMD and still take advantage of some or all of the various techniques discussed herein. Like 170 in FIG. 3, there is one CLMD per cache line per logical processor that shares the cache. Like 170, there are potentially many VAMDs (one quadword) per cache line. In one implementation, unlike 170, there is not one copy of VAMDs per logical processor; instead there may be fewer copies; here there is only one copy that is potentially shared by all the logical processors that share the cache. That copy is qualified by the MDID, which is allocated eight bits. Again, these bit allocations are exemplary in nature, and other allocations could be used in other implementations. As described below, a VAMD metadata access instruction matches both the metadata address and the metadata identifier in order to access a specified metadata word. It will also be appreciated that in other implementations more than one copy of VAMDs and associated MDIDs may be retained per cache line.

To future illustrate the additional cache metadata and metadata identifier design, as in the discussion of FIG. 4, shown below is hardware definition pseudocode of the baseline cache state model, plus the cache metadata state hardware state detailed in the discussion of FIG. 4, further modified to reflect inclusion of an MDID tag for each copy of VAMDs for a line and to reflect removal of separate per-logical-processor copies of VAMD state for a line. The cache metadata state is highlighted in bold, and the MDID-specific aspects are underlined:

(P1-P4) that have shared access to the same cache metadata state. P1 has been assigned an MDID of 200, and so has P2. Since P1 and P2 both share the same MDID, both are able to write and read back the same cache metadata. The solid arrows illustrate that when either P1 or P2 issue a VAMD_GET instruction for address B and MDID 200, they retrieve a copy of the same VAMD metadata. If metadata is written with a VAMD_SET instruction with parameters address B, MDID 200, the other can read back that value with a subsequent VAMD_GET instruction. P3, on the other hand, has been assigned an MDID of 400, and therefore is logically isolated from the activities of P1 and P2, and does not read back cache metadata assigned to P1 and P2 by virtue of their MDID 200. As the dotted line illustrates, while P3 can still read cached data at address B, P3's attempt to read cache metadata associated with address B, but with MDID=400,

```
// Simple exemplary 64 KB direct mapped L1 d-cache
const int NLPS = 4;            // no. of logical processors
const int NLINES = 1024;
const int LINESIZE = 64;       // line size (bytes)
typedef void* VA;              // virtual address
typedef void* PA;              // physical address
typedef void* VALUE;           // arbitrary integer or FP data
typedef int LP;                // logical processor no.
typedef void (*HANDLER)( );    // function pointer e.g. address in instruction stream
const int MDIDBITS = 8;        // no. of cache metadata identifier bits
typedef bit MDID[MDIDBITS];    // cache metadata identifier
const MDID MDID_INVALID = ~0;  // reserved, invalid MDID value
const int VAMDBITS = 4;        // no. of virtual address metadata bits
typedef bit VAMD[VAMDBITS];    // virtual address metadata "word"
const int VAMDSTRIDE = 8;      // no. of bytes covered per VAMD (e.g. quadword)
const int NVAMDS = LINESIZE/VAMDSTRIDE;
const int CLMDBITS = 8;        // no. of line metadata bits
typedef bit CLMD[CLMDBITS];    // line metadata "word"
const int CLMD—SPECWRITE = 0;  // bit position of special CLMD bit to
                               // track and enforce speculative writes
struct LINE {
    PA tag;                    // cache line address tag
    enum MESI { M, E, S, I } mesi;  // cache line coherence state
    byte data[LINESIZE];       // cache line data
    MDID mdid;                 // metadata context identifier,
                               // validates vamds[]
    VAMD vamds[NVAMDS];        // separate VAMD per quadword,
                               // validated by mdid, shared by all logicalprocs
    CLMD clmds[NLPS];          // separate CLMD per logical processor
}
struct CMD {                   // cache metadata per logical processor
    MDID mdid_curr;            // current metadata context identifier
    CLMD clmd—evictions;       // or'd line evictions+invals summary
    CLMD clmd—specwritesmask;  // subset of CLMD bits that indicate
                               // speculative writes
    CLMD clmd—default;         // default line load CLMD value
    VAMD vamd—default;         // default line load VAMD value
                               //  (copied to every quadwords' VAMDs)
    HANDLER clmd—eviction—handler;     // eviction handler address
    CLMD clmd—eviction—handler_mask;   // eviction handler event mask
}
struct CACHE {
    LINE lines[NLINES];
    ...
    CMD cmds[NLPS];
}
struct CORE {
    ...
    CACHE dcache;
    LP lp;                     // current logical processor no.
}
CORE core;
```

Figure 27:
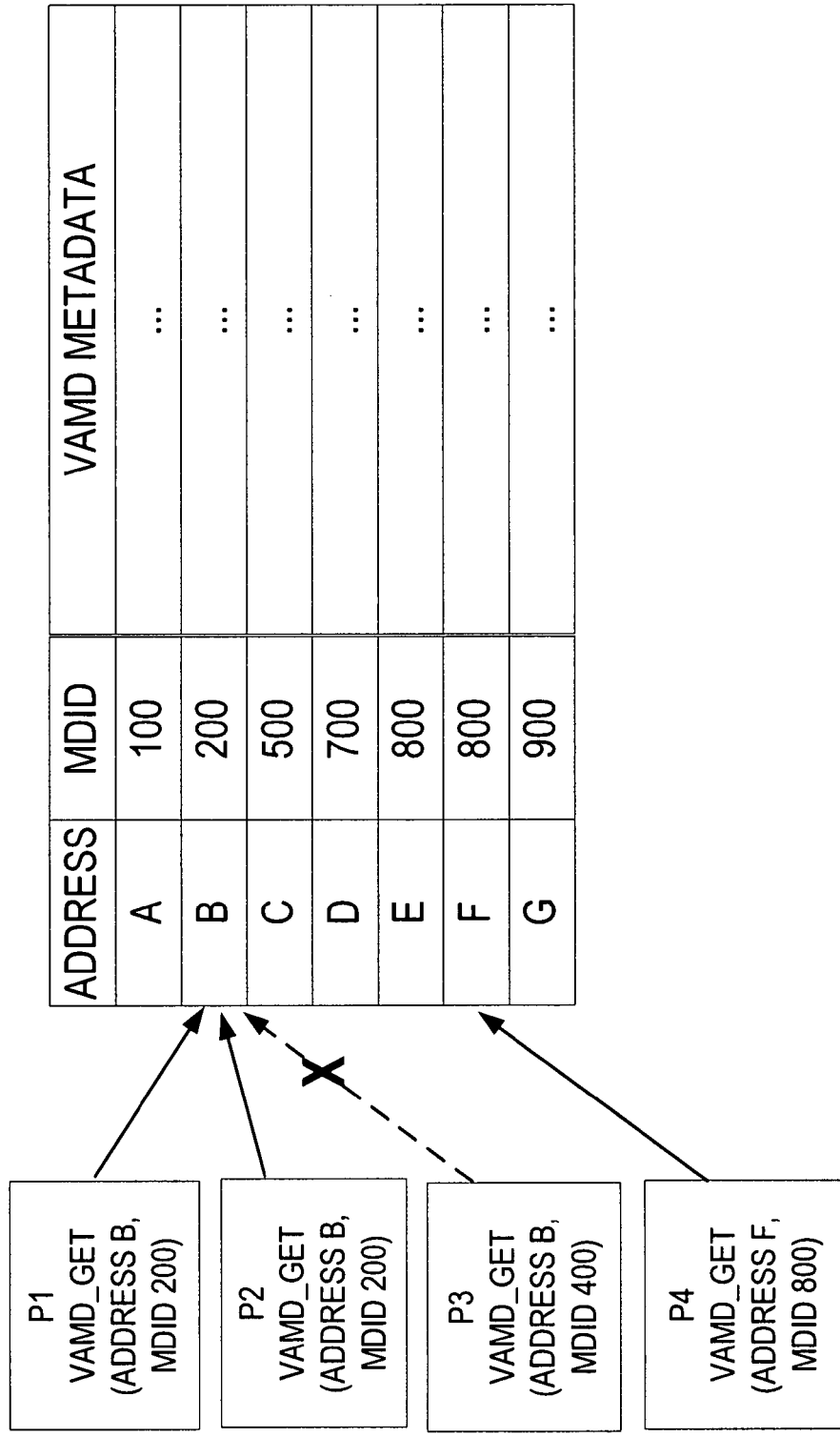
FIG. 27 is a diagrammatic view of one implementation that illustrates using metadata identifiers for isolation of cache metadata and/or for cache metadata sharing among multiple logical processors or subsystems.

FIG. 27 is a diagrammatic view of one implementation that illustrates using metadata identifiers for isolation of cache metadata and/or for cache metadata sharing among multiple logical processors or subsystems. In the example 780 shown, there are multiple processors and/or software subsystems will not see P1 and P2's metadata stored under MDID=200. Instead, P3 will read a default or other value. Similarly, since P4 has been assigned a unique MDID of 800, its accesses to cache metadata, for example to read the VAMD metadata at address F, behave as if it enjoyed a private metadata cache all of its own. As described below, if P4 were to write metadata via VAMD_SET to address B, MDID=800, its update of its metadata at B could replace (evict or discard) the metadata there formerly under MDID=200. By using metadata identifiers to access cache metadata, metadata can be isolated from processes and/or subsystems that should not observe or interfere with that metadata. Alternatively or additionally, metadata can be shared among different processes and/or subsystems by sharing a common MDID.

As a non-limiting example, even on one logical processor, the cache metadata with metadata identifiers could be used to accelerate computations within a variety of separate software subsystems. For example, cache metadata with MDIDs could accelerate arbitrary software interleavings of transactional memory barriers, garbage collection memory barriers, and/or some operations of a virtual machine. The different subsystems may need to use metadata at the same address, e.g. transactional memory runtime state for address A, garbage collection state for address A, virtual machine state for address A, etc. Metadata identifiers provide simultaneous isolated metadata or shared metadata support for multiple subsystems through assigning different MDIDs to different subsystems, and/or the same MDIDs to subsystems or operations that need to share a common metadata state.

Although FIG. 27 illustrates accesses to a simple, direct mapped, one level cache (with metadata), other implementations are not limited to such cache topologies. In an associative or multi-level cache, just as happens with regular data loads and stores, on a metadata access, the hardware would probe each cache 'associativity way' and level of the cache, searching for the line with the matching address tag and matching MDID tag. When data is evicted from one level of cache, it is optionally copied back to the next higher level of cache. Here too when cache metadata is evicted it may be copied back to the next higher level of cache (assuming that level, too, implements cache metadata with metadata identifiers).

Now we consider hardware instruction set architecture facilities to access cache metadata with metadata identifiers. In one implementation, instructions that access individual VAMD metadata, such as those described earlier in 372 in FIG. 10, must contain parameters for both the data address and an explicit MDID value. In another implementation, each logical processor has a Current MDID control register and the value in that register is implicitly applied to instructions that access VAMD metadata sans an explicit MDID parameter. Alternatively or additionally, an instruction set architecture may provide both explicit MDID and implicit MDID forms, or arbitrary combinations. In that light, FIG. 28 illustrates some exemplary hardware instructions that can be used to apply cache metadata with metadata identifiers.

In one implementation, hardware instructions 800 alternatively or additionally include instructions for setting the Current MDID control register 804, and getting the Current MDID control register 806. An example of a hardware instruction definition pseudocode is shown below for setting and getting the current MDID.

```
// SET_MDID_CURR:
// Set the Current MDID control register for this logical processor.
instruction void cache_set_mdid_curr(MDID mdid) {
    dcache.cmds[lp].mdid_curr = mdid;
}
// GET_MDID_CURR:
// Get the Current MDID control register for this logical processor.
```

-continued

```
instruction VAMD cache_get_mdid_curr( ) {
    return dcache.cmds[lp].mdid_curr;
}
```

Hardware instructions 800 can alternatively or additionally include instructions for getting the number of MDID bits 808. The instruction returns the implemented number of MDID bits. An example of a hardware instruction definition pseudocode is shown below for getting the number of MDID bits.

```
// GET_MDID_BITS:
// Return implemented no. of MDID_BITS (no. of bits in an MDID).
instruction unsigned get_mdid_bits( ) {
    return MDID_BITS;
}
```

Hardware instructions 800 can alternatively or additionally include instructions for getting and setting the VAMD for an address and MDID (812 and 814). The VAMD_GET instruction 812 returns the current VAMD for the datum at address "va" for the logical processor's Current MDID control register (previously established using SET_MDID_CURR 804). The VAMD_SET instruction 814 sets the current VAMD for the datum at the specified address "va" for the logical processor's Current MDID control register. In other words, these instructions can be used to get and set the values in the cache metadata for a specified address for the Current MDID (implicit parameter). An example of a hardware instruction definition pseudocode is shown below for getting and setting the VAMD values. These use the vamd_va( ) helper hardware pseudocode, presented below, to access the VAMD for the given address and the implicit Current MDID control register.

```
// VAMD_GET
// Return the current VAMD for the datum at address 'va' and the implicit
Current MDID.
instruction VAMD vamd_get(VA va) {
    return vamd_va(va);
}
// VAMD_SET
// Set the current VAMD for the datum at the specified address 'va' and
// the implicit Current MDID.
instruction void vamd_set(VAMD vamd, VA va) {
    vamd_va(va) = vamd;
}
```

Hardware instructions 800 can alternatively or additionally include instructions for getting and setting the VAMD (816 and 818) for an address, but with an explicit MDID parameter. In one implementation, these instructions can be provided in addition to instructions 812 and 814 described above which just used the default value assigned for the MDID, and when both are present, the appropriate version to use can be selected depending on the context or by using other logic. In another implementation, these instructions can be provided instead of instructions 812 and 814 described above. In such a case, all uses of instructions that need an MDID value would receive it as an explicit parameter. An example of a hardware instruction definition pseudocode is shown below for getting and setting the VAMD values with an explicit MDID parameter. These use the vamd_va_mdid( ) hardware pseudocode helper routine, presented below, to access the VAMD for the given address and the explicitly specified MDID.

```
// VAMD_GET2 - like VAMD_GET but with explicit MDID parameter.
// Return the current VAMD for the datum at address 'va' and specified
MDID.
instruction VAMD vamd_get2(VA va, MDID mdid) {
        return vamd_va_mdid(va, mdid);
}
// VAMD_SET2 - like VAMD_SET but with explicit MDID parameter.
// Set the current VAMD for the datum at the specified address 'va' and
specified MDID.
instruction void vamd_set2(VAMD vamd, VA va, MDID mdid) {
        vamd_va_mdid(va, mdid) = vamd;
}
```

Similarly other VAMD instructions described and applied earlier, and outlined in 372 in FIG. 10 may be provided in an explicit MDID parameter variant and an implicit (Current MDID control register) variant.

Some of the previous examples reference hardware pseudocode helper routines to obtain the VAMD for a given address and MDID (explicit or implicit). These are provided below, routines vamd_va( ) and vamd_va_mdid( ). Both in turn reference the helper routine validate_line_mdid( ), which ensures the cache line is loaded, then compares the MDID parameter with the cache line's MDID. If not equal, the hardware reinitializes that metadata to a default or other value, and updates the cache line's MDID to reflect the software supplied MDID parameter. Then, having established a matching MDID on the line, hardware accesses (reads or writes) the specified metadata.

```
// Return a reference to the VAMD for the address 'va' and the current
LP's Current MDID.
private VAMD& vamd_va(VA va) {
        validate_line_mdid(va, dcache.cmds[lp].mdid_curr);
        return dcache.lines[line_va(va)].vamds[offset_va(va)];
}
// Return a reference to the VAMD for the address 'va' and the explicitly
specified MDID.
private VAMD& vamd_va_mdid (VA va, MDID mdid) {
        validate_line_mdid(va, mdid);
        return dcache.lines[line_va(va)].vamds[offset_va(va)];
}
// (Re)validate a cache line for an address 'va', anticipating cache metadata
// accesses for the specified mdid parameter.
private void validate_line_mdid(VA va, MDID mdid) {
        validate_line(va);
        LINE& line = dcache.lines[line_va(va)];
        // If the specified mdid does not match the line's VAMD
        // metadata identifer, then reinitialize the line's metadata
        // to the LP's default values and record that this MDID now
        // does own the VAMD metadata for the line.
        if (line.mdid != mdid) {
                line.mdid = mdid;
                for (int i = 0; i < NVAMDS; i++)
                        line.vamds[i] =
                                dcache.cmds[lp].vamd_default;
        }
}
```

Figure 29:
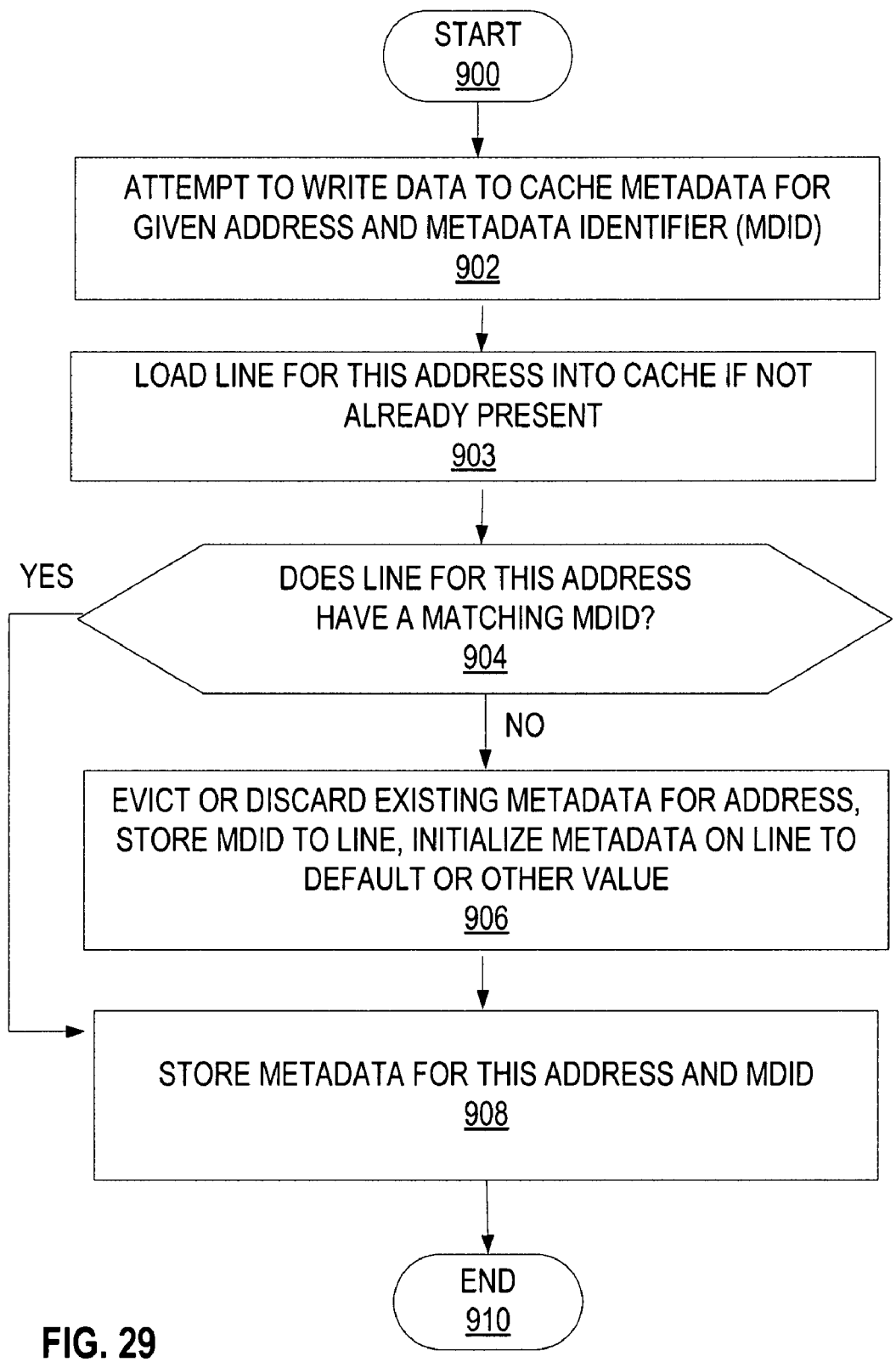
FIG. 29 is a process flow diagram of one implementation that illustrates performing a write to cache metadata using metadata identifiers.
Figure 30:
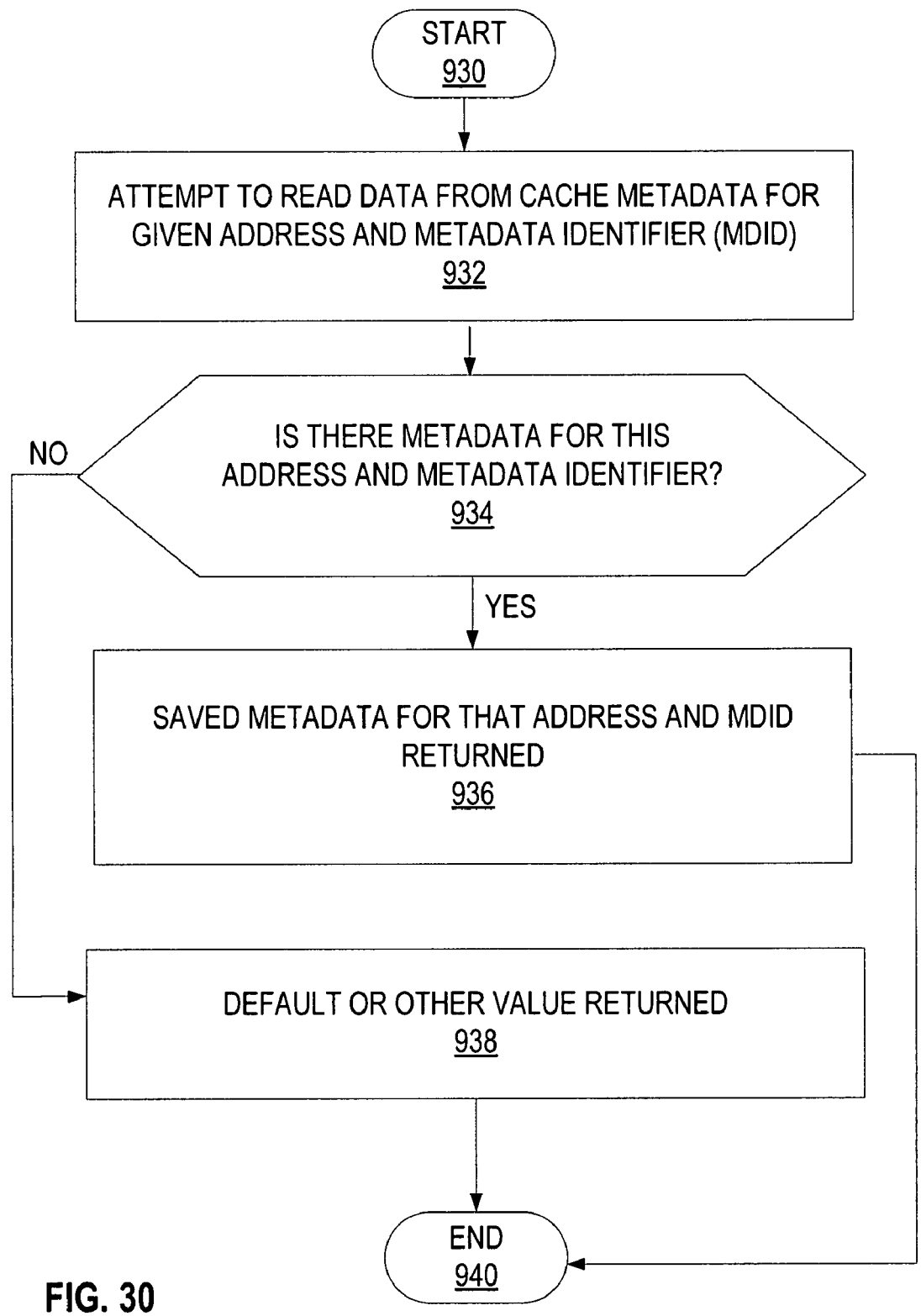
FIG. 30 is a process flow diagram for one implementation that illustrates performing a read from cache metadata using metadata identifiers.

These processes are also depicted in FIGS. 29 and 30. In some implementations, the processes of FIGS. 29-30 are at least partially implemented in the operating logic of computing device 100. FIG. 29 is a process flow diagram of one implementation that illustrates performing a write to cache metadata using metadata identifiers. The process begins at start point 900 with attempting to write cache metadata for a given address and MDID (stage 902). The hardware first loads the line being written into in to the data cache if not already present (stage 903). Then, if the addressed cache line's MDID is not equal to the given MDID parameter (decision point 904), the existing metadata for a different MDID must first be evicted (perhaps to the next level of cache) or discarded, the given MDID written into the line's MDID, and the MDID-validated metadata on the line initialized to a default or other value (stage 906). Now that the cache line has a matching MDID, the metadata for this address and MDID are stored on the line (stage 908). The process ends at end point 910.

FIG. 30 is a process flow diagram for one implementation that illustrates performing a read from cache metadata using metadata identifiers. The process begins at start point 930 with attempting to read cache metadata for a given address and metadata identifier (stage 932). If there is metadata for this address and metadata identifier, i.e. the cache line for that address is valid and also the cache line's MDID is equal to the given MDID parameter (decision point 934), then the current (last written) metadata for that MDID and address is returned (stage 936). If there is no metadata for this address and metadata identifier (decision point 934), then the default or another value is returned (stage 938). The process ends at end point 940. In one implementation, there is no effect upon the contents of the cache or the cache metadata if the metadata access is for an address not present in the cache, or for some other MDID. However, it will be appreciated that other cache replacement policies could be in effect—for example, loading the cache line containing the addressed data, or writing the given MDID into the line's MDID and initializing its metadata.

As discussed earlier, various operations such as execution of memory access instructions may trigger the loading of a line of data into the cache. In this implementation, the hardware initializes the cache line's metadata state—for example initializing CLMD for each logical processor, as well as initializing the line's MDID to an MDID_INVALID value. This is a reserved value selected so as to never compare equal to any MDID parameter that may be assigned to software. This ensures that just after a cache line is loaded, a metadata read does not return stale metadata from a prior metadata usage. This process is illustrated in the following hardware pseudocode.

```
// Whenever the hardware loads a new cache line, also perform this cache
// metadata specific behavior.
void load_line(LINE& line) += { // here += denotes extension of baseline
load_line behavior
        // initialize each logical processor's clmd
        for (int lp = 0; lp < NLPS; lp++)
                line.clmds[lp] = dcache.cmds[lp].clmd_default;
        // mark each line's vamds as invalid
        line.mdid = MDID_INVALID;
}
```

Now that some exemplary hardware has been illustrated for cache metadata with metadata identifiers, let's now turn to FIGS. 31-35 to illustrate some examples of how to apply metadata and MDIDs. These examples illustrate accelerating parallel computations and/or nested computations. In some implementations, the processes of FIGS. 31-35 are at least partially implemented in the operating logic of computing device 100.

Figure 31:
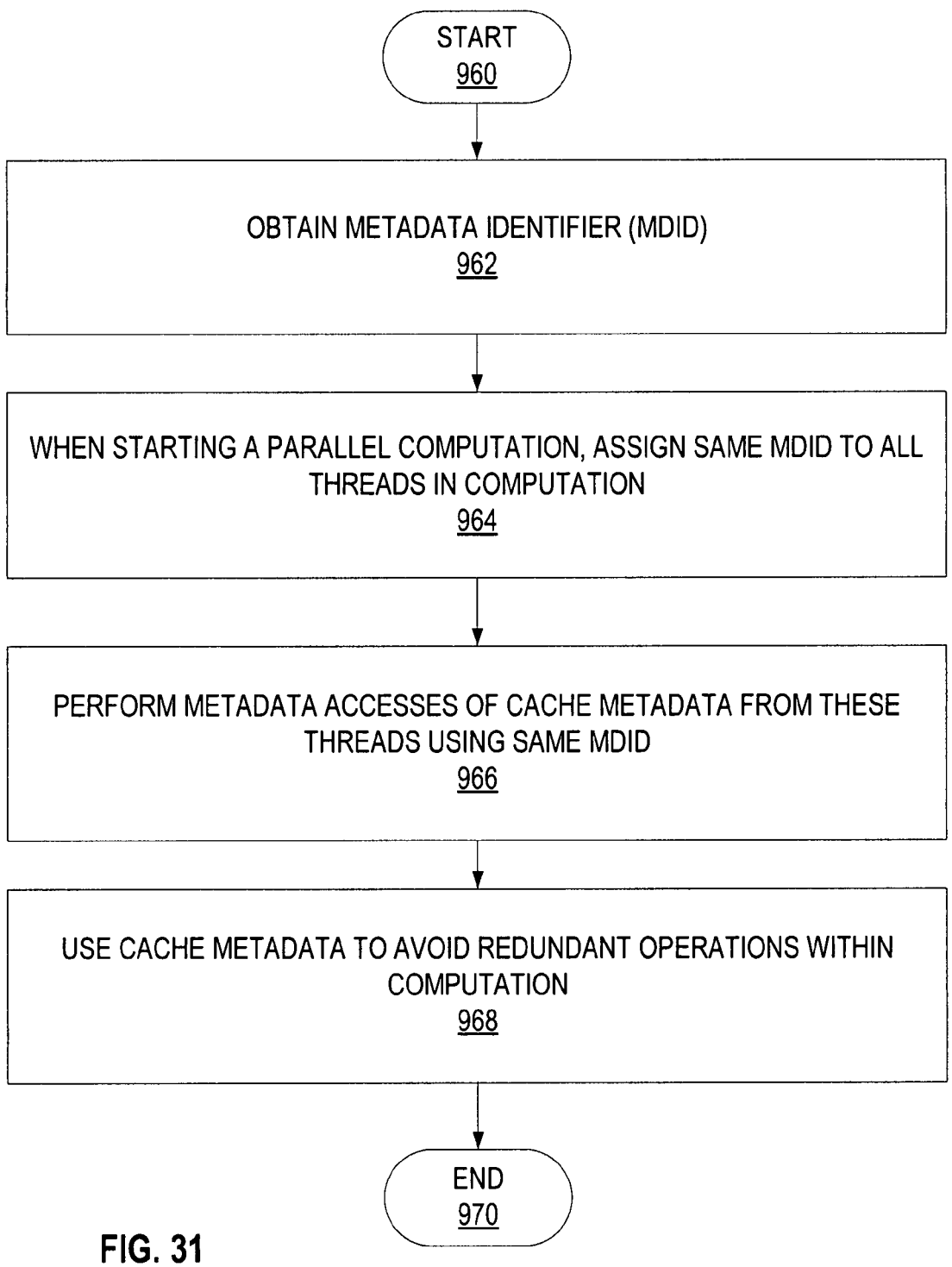
FIG. 31 is a process flow diagram for one implementation that illustrates accelerating a parallel computation using cache metadata and metadata identifiers.

FIG. 31 is a process flow diagram for one implementation that illustrates accelerating a parallel computation using cache metadata and metadata identifiers. The process begins at start point 960 with obtaining a metadata identifier (stage 962). Later when starting a parallel computation, this same MDID is assigned to all of threads in the parallel computation (stage 964). At least some of the metadata accesses of the cache metadata are performed by these threads using this common MDID (stage 966). The cache metadata can be used to avoid redundant operations within the computation (stage 968), such as using some or all of the techniques for avoiding redundant operations that were described in FIGS. 1-22, but now in combination with the metadata identifiers. The process ends at end point 970.

As one non-limiting example to how the process of FIG. 31 can be used, the computation can be a transaction, and these techniques can be used to accelerate the parallelization of the transaction. Take the below source code as an example.

```
void map(List<Item> items, void fn(Item)) {
    atomic {
        forall (Item item in items) {
            fn(item);
        }
    }
}
```

Within a transaction (atomic block), function fn is to be applied to (invoked upon) each item in the list of items, in parallel. These applications of fn can occur upon multiple logical processors which share the transactional memory isolation of the parent transaction, and which are isolated from the views of transactional memory of other logical processors running software threads outside this transaction. As was described in FIG. 1-22 herein, cache metadata can be used to accelerate the test "has data at address A already undergone the transactional memory read barrier in this transaction, on this logical processor?" With the addition of and use of metadata identifiers, an additional question can also be answered: "has data at address A already undergone the transactional memory read barrier in this transaction on this or any other logical processor in this parallel transaction?" In other words, in a transaction containing parallel execution, if one logical processor has taken the read barrier for address A, the other logical processors in the transaction, upon reading data at address A, need not redundantly take the same barrier. Similarly, if some other software thread in the program was running a different transaction, and assigned a different MDID, then its metadata accesses via that different MDID are logically isolated from the metadata accesses of the first transaction's threads, as necessary for correct acceleration of transactional memory. By accessing cache metadata using, or not using, a shared metadata identifier across different logical processors, software can control and achieve both metadata sharing and metadata isolation across metadata accesses from different logical processors.

Figure 32:
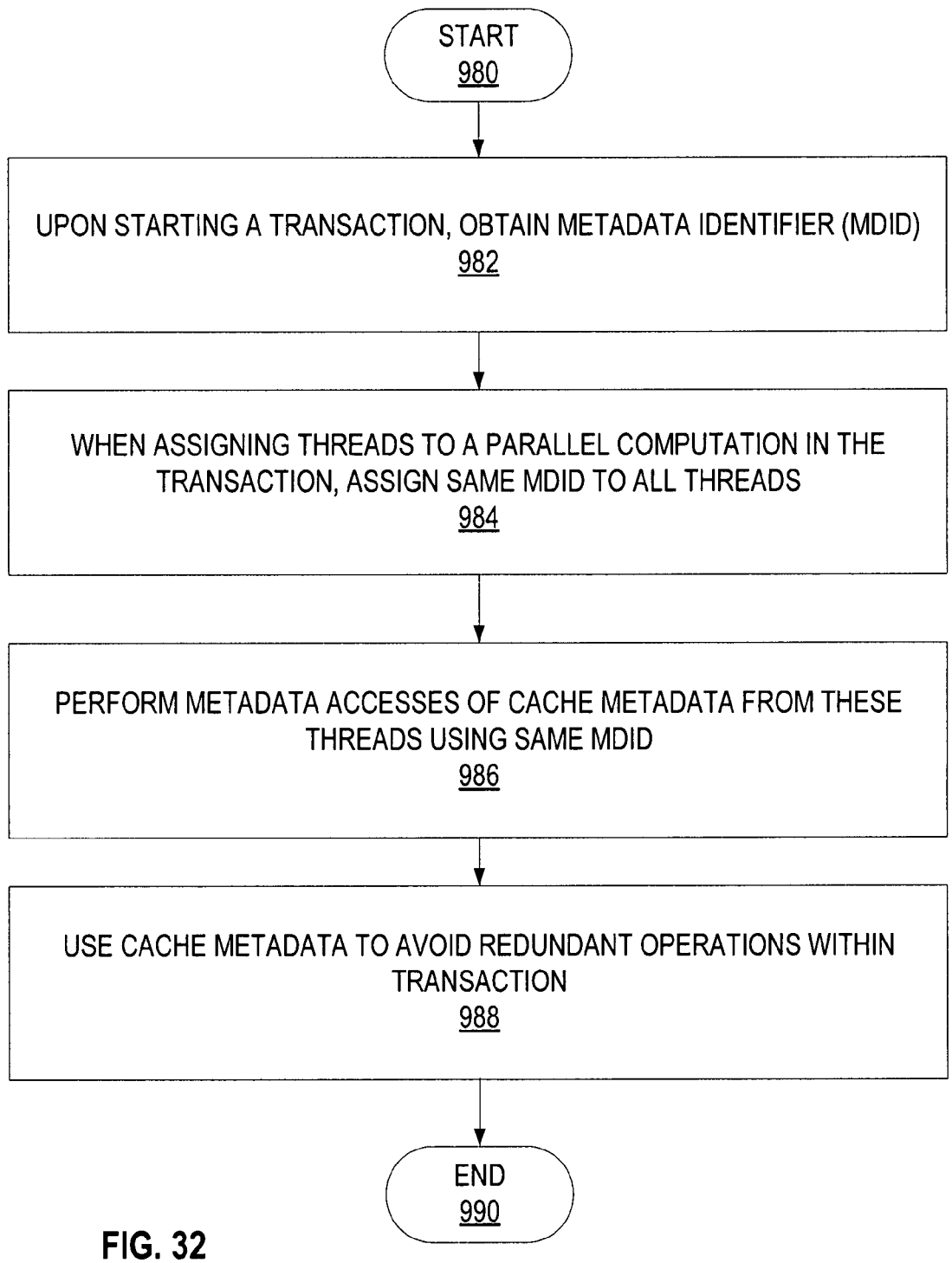
FIG. 32 is a process flow diagram for one implementation that illustrates accelerating a parallel transaction using cache metadata and metadata identifiers.

This usage of metadata identifiers and cache metadata with parallel transactions is further illustrated in FIG. 32. The process begins at start point 980 with starting a transaction block and obtaining a metadata identifier for the transaction (stage 982). Later when starting a parallel computation, this same MDID is assigned to all of threads in the parallel computation (stage 984). At least some of the metadata accesses of the cache metadata are performed by these threads using this common MDID (stage 986). The cache metadata can be used to avoid redundant transactional memory operations (stage 988), such as using some or all of the techniques for avoiding redundant operations that were described in FIGS. 1-22, but now in combination with metadata identifiers such as the common MDID across the threads of the parallel transaction. The process ends at end point 990.

Figure 33:
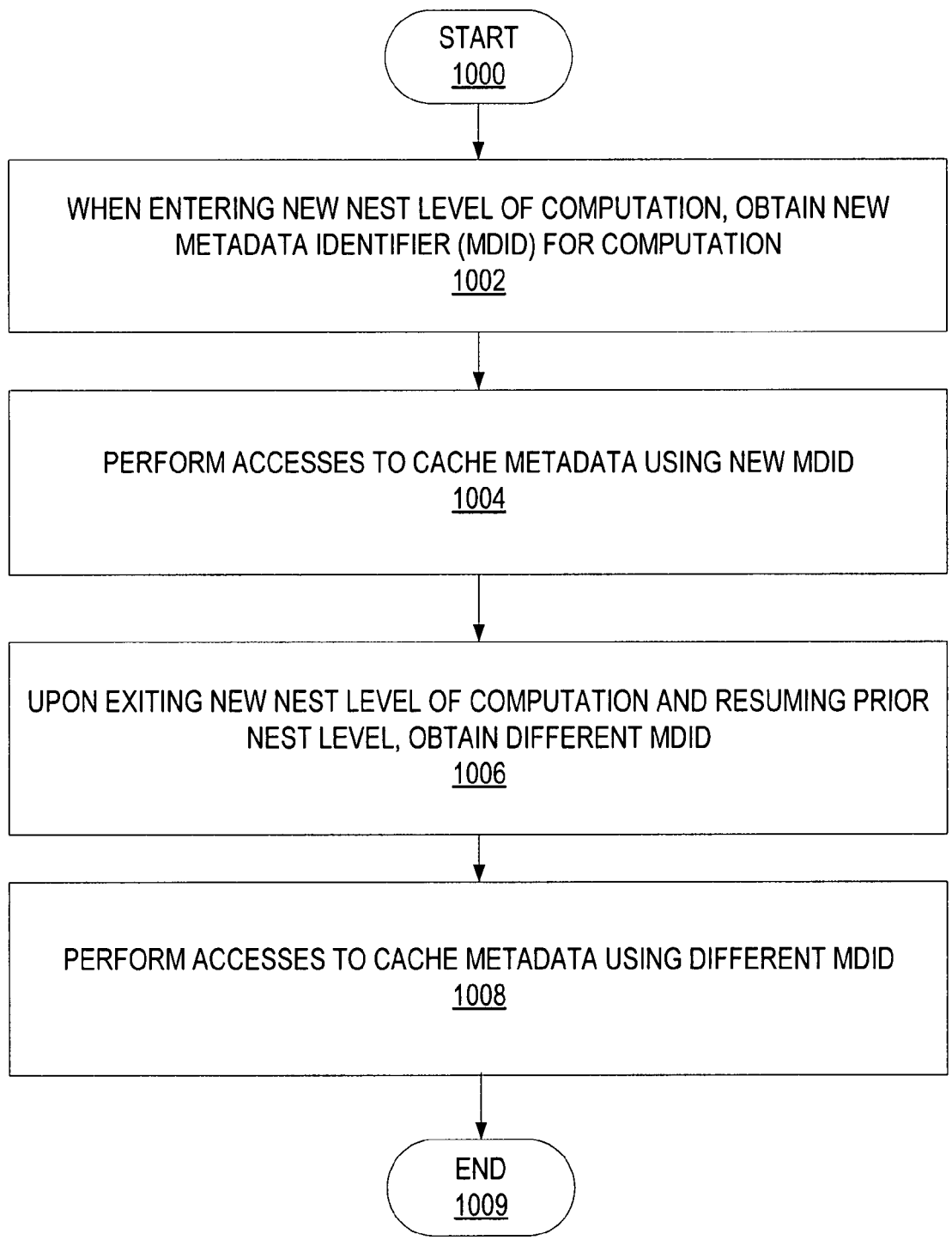
FIG. 33 is a process flow diagram for one implementation that illustrates accelerating nested computations using cache metadata and metadata identifiers.
Figure 34:
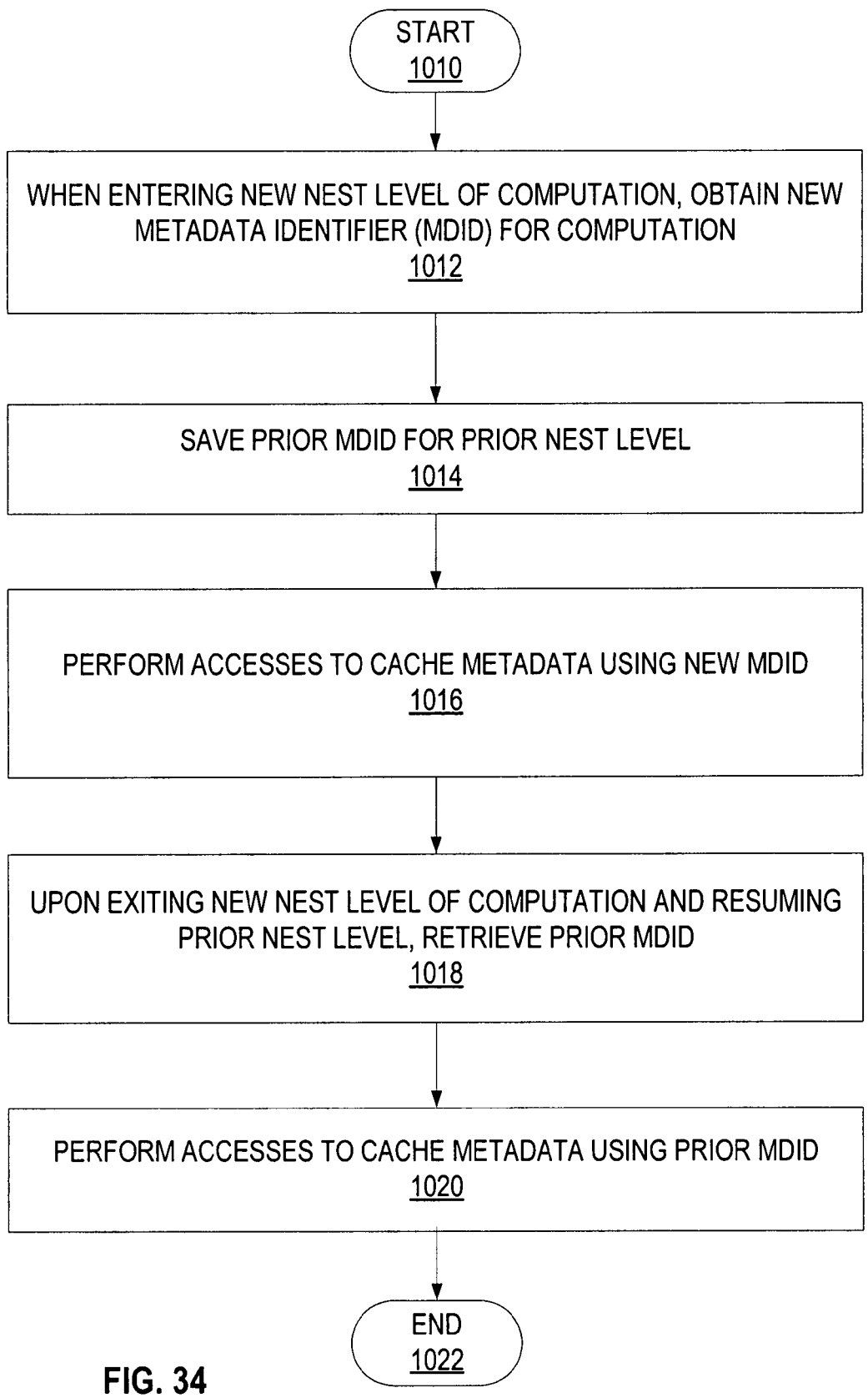
FIG. 34 is a process flow diagram for another implementation that illustrates accelerating nested computations using cache metadata and metadata identifiers.
Figure 35:
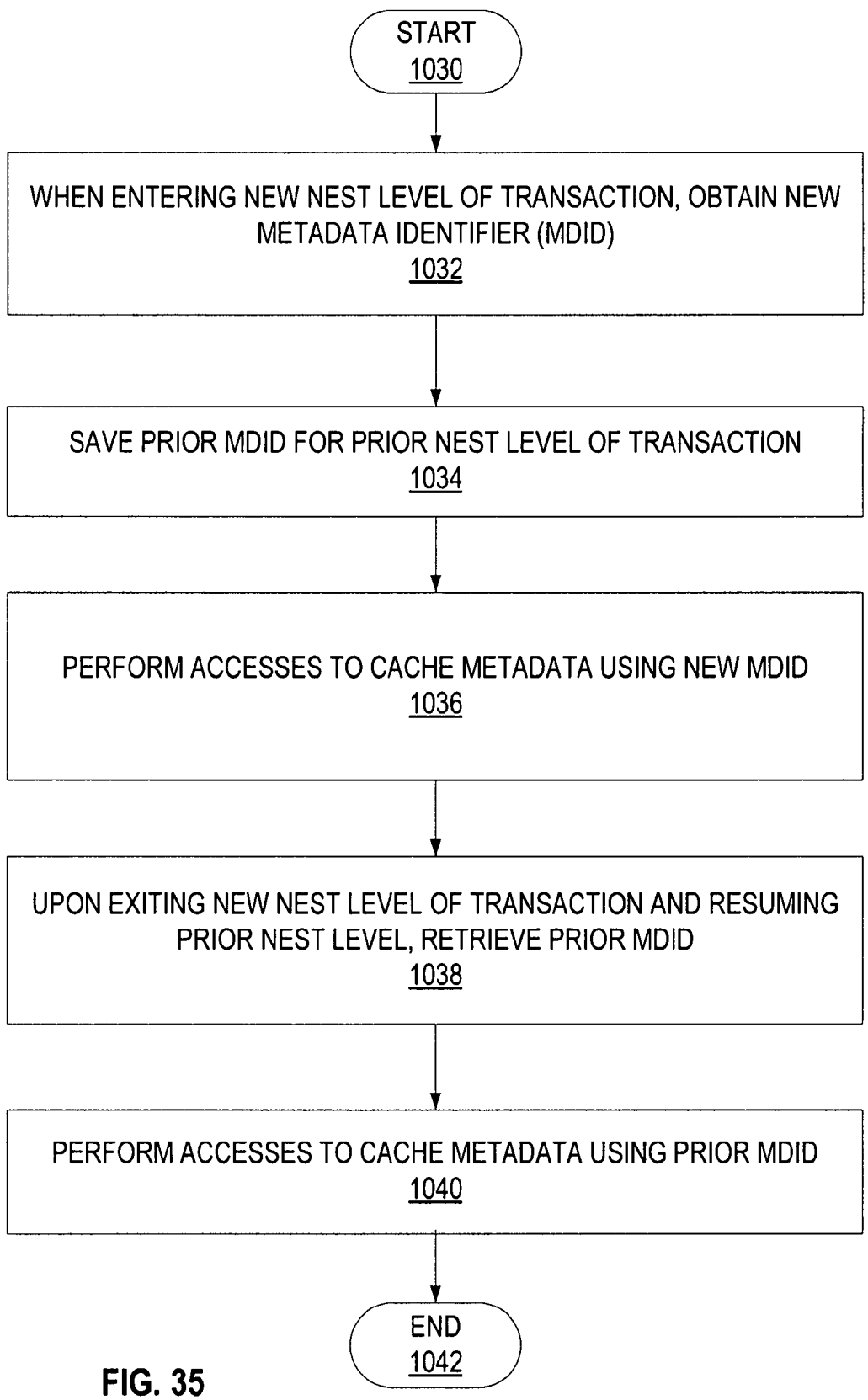
FIG. 35 is a process flow diagram for one implementation that illustrates accelerating nested transactions using cache metadata and metadata identifiers.

Moving on, FIGS. 33-35 are process flow diagrams that illustrate a few different variations for how nested computations can be accelerated using cache metadata and metadata identifiers. FIG. 33 begins at start point 1000 with obtaining a new metadata identifier for a computation when entering a new nest level of the computation (stage 1002). Accesses to the cache metadata are performed using the new MDID (stage 1004). Upon exiting the new nest level of the computation and resuming a prior nest level, a different MDID is obtained (stage 1006). Accesses to the cache metadata are then performed using the different MDID (stage 1008). The process ends at end point 1009. By using one MDID for cache metadata accesses before the nested computation, a second MDID during the nested computation, and a third MDID following the nested computation, isolated accesses to metadata are achieved between each of these three phases of the computation.

A second variation will now be described in FIG. 34, which begins at start point 1010. When entering a new nest level of a computation, a new metadata identifier is obtained for the computation (stage 1012). The prior MDID is also saved for the prior nest level (stage 1014), either before or after obtaining the new metadata identifier. Accesses to the cache metadata at the new nest level are performed using the new MDID (stage 1016). Upon exiting the new nest level of the computation and resuming the prior nest level, the prior MDID is retrieved (stage 1018). Accesses to the cache metadata at the prior nest level are then performed using the prior MDID (stage 1020). The process ends at end point 1022.

As an example, the processes described in FIGS. 33 and/or 34 can be used to accelerate nested transactions. The nest levels described in FIGS. 33 and 34 would be the nest levels of the transactions. Take the following nested transaction code example:

```
int i = 0;
void a( ) {
    atomic /*T1*/{
        ++i;
        b( );
        ...
    }
}
void b( ) {
    atomic /*T2*/{
        ++i;
        c( );
        ...
    }
}
void c( ) {
    atomic /*T3*/{
        ++i;
        ...
    }
}
```

In this example, when a calls b, which then calls c, each function creates a transaction, possibly dynamically nested in the enclosing transaction, e.g. T1, T2(T1), and T3(T2(T1)).

First let us consider how the cache metadata system of FIGS. 1-22 might be applied to accelerating the redundancy check for all of the transactional memory access barriers across this program. For example, a metadata-accelerated redundancy-filtered write of a variable 'i' might be implemented by this software pseudocode:

```
if (vamd[&i] == 0) { // (VAMD_GET) -- test whether we've already
taken this barrier for &i
    vamd[&i] = 1; // (VAMD_SET) -- remember we have now taken
        this barrier for &i
    // perform write memory barrier, e.g. lock i and/or log the current
        value of i
}
```

If each of the three transactions T1, T2(T1), and T3(T2 (T1)) share the same VAMD metadata, the memory barrier redundancy filtering will not work correctly—for example, the write of 'i' in T1 sets the VAMD metadata denoted here as vamd[&i] and the subsequent write of 'i' in T2(T1) would test this same VAMD and then incorrectly skip the necessary logging of the first write to 'i' in T2(T1). However, by using logically separate bits of metadata state for T1 and T2(T1), this problem can be avoided. In FIGS. 1-22, several VAMD bits per address were specified, such as 4 VAMD bits per quadword. Software could then arrange to use bit 0 the VAMD for the outer nested transaction, bit 1 for the next innermost nested transaction, and so on. But with this example there are only a small, fixed number of VAMD bits available. If the depth of transaction nesting exceeds the number of bits of metadata provided by hardware, it becomes necessary to abandon use of cache metadata at some point—at least some of the nested transaction levels must revert to unaccelerated pure software transactional memory algorithms.

In contrast, in one implementation, with the introduction of metadata identifiers (which depending upon implementation may take on tens or hundreds or other distinct values) much greater depths of nested transactions can be directly accelerated using cache metadata. Accordingly, the metadata-filtered write might be implemented by the following software pseudocode:

```
if (vamd[&i, txn.mdid] == 0) {
    vamd[&i, txn.mdid] = 1; // remember we have done this one
    // perform write memory barrier, e.g. lock i and log the current
        value of i
}
```

Assuming each separate nest level of transactions is assigned (by a transactional memory software runtime) a unique metadata identifier per transaction or nested transaction (txn.mdid), the context-enhanced metadata enables separate (logically disjoint) state for each nest level.

In other words, all nest levels can enjoy their own metadata-accelerated redundant-barrier-filtering with no logical interference and with good physical sharing of finite cache metadata resources. In particular, in this scenario is enabled:

```
void f( ) {
    int i = 0;
    ...
    int j = 0;
    ...
    atomic /*T1*/ {
        ...
        ++i; // TM system inserts: if (vamd[&i, T1.mdid] == 0) ...
        ...
        atomic /*T2*/ {
            ++j; // TM system inserts: if (vamd[&j, T2.mdid] == 0) ...
        }
        ...
        ++i; /*!*/ // TM system inserts: if (vamd[&i, T1.mdid] == 0) ...
        ...
    }
}
```

Here on the line marked /*!*/, it is likely the second test of vamd[&i, T1.mdid] will succeed, as desired, because it is unlikely that the access and store to vamd[&j, T2.mdid] conflicts with the cache metadata at vamd[&i, T1.mdid].

This usage of metadata identifiers and cache metadata with nested transactions is also illustrated in FIG. 35, which begins at start point 1030. When in a transaction and entering a nested transaction, a new metadata identifier is obtained for the nested transaction (stage 1032). The prior MDID is also saved for the prior nest level of transaction (stage 1034), either before or after obtaining the new metadata identifier. Accesses to the cache metadata from within the new transaction nest level are performed using the new MDID (stage 1036). Upon exiting the new nest level of the transaction and resuming the prior nest level, the prior MDID is retrieved (stage 1038). Accesses to the cache metadata at the prior nest level are then performed using this prior MDID (stage 1040). The process ends at end point 1042.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system comprising:
    a multiprocessor having at least one central processing unit, the central processing unit having:
    a cache comprising a plurality of cache lines, wherein a respective cache line of the plurality of cache lines is augmented by a plurality of cache metadata, the plurality of cache metadata including virtual address metadata and software-controlled metadata identifiers that allow a plurality of logical processors to share the plurality of the cache metadata; and
    a software-visible instruction set, one or more instructions of the software-visible instruction set being executable by each of the plurality of logical processors to interact with the plurality of cache metadata including the virtual address metadata in conjunction with carrying out a corresponding computation;
    wherein the sharing of the plurality of cache metadata including the virtual address metadata comprises issuing instructions from the software-visible instruction set that include a same metadata identifier as a parameter by different ones of the plurality of logical processors, the same metadata identifier comprising a value that identifies a usage context, instance, or subset of cache metadata.

2. The system of claim 1, wherein the metadata identifiers are used to achieve isolation between logically distinct accesses to the cache metadata.

3. The system of claim 1, wherein the cache metadata can be shared among multiple logical processors by assigning each of the multiple logical processors a same metadata identifier.

4. The system of claim 1, wherein each metadata identifier is associated with a separate logical processor to achieve software thread isolation.

5. The system of claim 1, wherein the metadata identifiers are operable to accelerate parallelism within transactions by allowing a plurality of software threads within a same transaction to share a same one of the metadata identifiers and a corresponding metadata state.

6. The system of claim 5, wherein the plurality of software threads are isolated from other software threads that are not part of the same transaction.

7. The system of claim 1, wherein a plurality of nested transactions are accelerated by assigning a unique one of the metadata identifiers to each separate nesting level of the nested transactions.

8. The system of claim 7, wherein each separate nesting level uses the cache metadata to eliminate redundant transactional memory operations.

9. The system of claim 1, wherein a plurality of software subsystems each use a distinct sub-range of the metadata identifiers to accelerate one or more computations by metadata instructions.

10. The system of claim 1, wherein a plurality of software subsystems each use a distinct sub-range of the metadata identifiers to access a corresponding portion of the cache metadata.

11. The system of claim 1, wherein a plurality of software subsystems can share the cache metadata during a same interval of time.

12. The system of claim 1, wherein the cache metadata are present at a plurality of levels in the cache.

13. A method for accelerating a parallel computation using a plurality of cache metadata and metadata identifiers, comprising:
obtaining a metadata identifier;
when parallelizing a computation, assigning the metadata identifier to a plurality of parallel threads in the computation; and
issuing instructions from a software-visible instruction set in each of the plurality of parallel threads to interact with at least some cache metadata of the plurality of cache metadata, at least one of the plurality of cache metadata comprising a virtual address metadata and metadata identifier, wherein different threads from the plurality of parallel threads can interact with the same metadata of the plurality of cache metadata by issuing instructions from the software-visible instruction set that include the metadata identifier as a parameter, the same metadata comprising the virtual address metadata and the metadata identifier, the metadata identifier comprising a value that identifies a usage context, instance, or subset of the cache metadata.

14. The method of claim 13, wherein the cache metadata are used to avoid redundant operations within the computation.

15. The method of claim 13, wherein the computation is a transaction.

16. A method for accelerating nested computations using multiple metadata identifiers comprising:
when entering a new nest level of a computation, obtaining a new metadata identifier for the new nest level of the computation, the new metadata identifier comprising a value that uniquely identifies first cache metadata, the first cache metadata comprising first virtual address metadata and first cache line metadata associated with a cache line that comprises a data address, and the first virtual address metadata comprising at least one open-for-read bit position;
issuing first instructions from an instruction set of a central processing unit for performing accesses to the first cache metadata comprising the first virtual address metadata wherein the first instructions include the new metadata identifier as a parameter and the first instructions access the first cache metadata uniquely identified by the new metadata identifier, the instruction set being programmatically accessible to software applications executed by the central processing unit;
wherein the first cache metadata comprising the first virtual address metadata is at least used in open read barrier filtering to avoid redundant read logging within the new nest level of the computation; and
upon exiting the new nest level of the computation and resuming at a prior nest level, obtaining a different metadata identifier; and
issuing second instructions from the instruction set of the central processing unit for performing accesses to a second cache metadata wherein the second instructions include the different metadata identifier, and the second instructions access the second cache metadata comprising a second virtual address metadata uniquely associated with the different metadata identifier, the second virtual address metadata comprising at least one log-for-undo bit position;
wherein the second virtual address metadata comprising the at least one logged-for-undo bit position is used to filter out redundant undo logging in the prior nest level of the computation.

17. The method of claim 16, wherein the different metadata identifier is a prior metadata identifier, and wherein upon entering the new nest level, the prior metadata identifier is saved, and wherein upon resuming at the prior nest level, the prior metadata identifier is retrieved and used for performing accesses to the cache metadata.

18. The method of claim 16, wherein the computation is a nested transaction.

19. A computer storage media having computer-executable instructions for causing a computer to perform a method, the method comprising:
when entering a new nest level of a computation, obtaining a new metadata identifier for the new nest level of the computation and saving a prior metadata identifier for a prior nest level of the computation, the new metadata identifier comprising a value that uniquely identifies first cache metadata comprising first virtual address metadata and first cache line metadata associated with a cache line that comprises a data address, and the first virtual address metadata comprising at least one open-for-read bit position;
issuing first instructions from an instruction set of a central processing unit for performing accesses to the first cache metadata, wherein the first instructions include the new metadata identifier and the data address as parameters, and wherein the first instructions access the first cache metadata comprising the first virtual address metadata uniquely identified by the new metadata identifier associated with the cache line comprising the data address, and return the first virtual address metadata, the instruction set being programmatically accessible to software applications executed by the central processing unit;

wherein the first virtual address metadata comprising the at least one open-for-read bit position is used to filter out redundant transactional read logging in the new nest level of the computation; and upon exiting the new nest level of the computation and resuming at the prior nest level, obtaining the prior metadata identifier; and issuing second instructions from the instruction set of the central processing unit for performing accesses to second cache metadata wherein the second instructions include the prior metadata identifier, and the second instructions access the second cache metadata comprising a second virtual address metadata uniquely associated with the prior metadata identifier, the second virtual address metadata comprising at least one logged-for-undo bit position, wherein the second virtual address metadata comprising the at least one logged-for-undo bit position is used to filter out redundant undo logging in the prior nest level of the computation.

* * * * *